US011778627B2

(12) United States Patent
Khoshnevisan et al.

(10) Patent No.: US 11,778,627 B2
(45) Date of Patent: Oct. 3, 2023

(54) TECHNIQUES FOR MULTIPLE COMPONENT CARRIER SCHEDULING

(71) Applicant: QUALCOMM Incorporated, San Diego, CA (US)

(72) Inventors: Mostafa Khoshnevisan, San Diego, CA (US); Kazuki Takeda, Tokyo (JP); Huilin Xu, Temecula, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/328,257

(22) Filed: May 24, 2021

(65) Prior Publication Data

US 2022/0022234 A1 Jan. 20, 2022

Related U.S. Application Data

(60) Provisional application No. 63/052,748, filed on Jul. 16, 2020.

(51) Int. Cl.
*H04W 72/12* (2023.01)
*H04W 72/23* (2023.01)
(Continued)

(52) U.S. Cl.
CPC ....... *H04W 72/23* (2023.01); *H04W 72/0453* (2013.01); *H04W 72/1263* (2013.01); *H04W 72/535* (2023.01)

(58) Field of Classification Search
CPC ......... H04W 72/0453; H04W 72/1289; H04W 72/1257; H04W 72/1263
See application file for complete search history.

(56) References Cited

U.S. PATENT DOCUMENTS

| 2015/0003425 A1* | 1/2015 | Kim | H04W 72/23 370/336 |
| 2016/0212734 A1* | 7/2016 | He | H04L 5/14 |

(Continued)

OTHER PUBLICATIONS

Huawei, et al., "Enhancements on Multi-TRP/Panel Transmission", 3GPP Draft, 3GPP TSG RAN WG1 #97, R1-1906029, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727486, 17 pages, Retrieved from the Internet: URL:http://www.3gpp.org/ftp/Meetings%5F3GPP% 5FSYNC/RAN1/Docs/R1%2D1906029%2Ezip [retrieved on May 13, 2019], the whole document, A Paragraph[0003]— Paragraph[0004], paragraph [0002].

(Continued)

*Primary Examiner* — Romani Ohri
(74) *Attorney, Agent, or Firm* — Holland & Hart LLP

(57) ABSTRACT

Methods, systems, and devices for wireless communications are described. A user equipment (UE) may receive downlink control information (DCI) messages scheduling downlink data transmissions at the UE, where at least one DCI message schedules two or more downlink data transmissions. The UE may determine, based on the DCI messages, a first set of downlink resources associated with a first control resource set (CORESET) group and a second set of downlink resources associated with a second CORESET group. The UE may receive one or more first downlink data transmissions on the first set of downlink resources and one or more second downlink data transmissions on the second set of downlink resources. The UE may communicate using a first set of parameters associated with the first CORESET group and a second set of parameters associated with the second CORESET group.

30 Claims, 19 Drawing Sheets

(51) Int. Cl.
*H04W 72/1263* (2023.01)
*H04W 72/0453* (2023.01)
*H04W 72/50* (2023.01)

(56) References Cited

U.S. PATENT DOCUMENTS

| | | | | |
|---|---|---|---|---|
| 2020/0314917 | A1* | 10/2020 | Jeon | H04W 74/08 |
| 2020/0351129 | A1* | 11/2020 | Kwak | H04W 72/53 |
| 2021/0006376 | A1* | 1/2021 | Cirik | H04W 72/1268 |
| 2022/0052824 | A1* | 2/2022 | Kim | H04L 1/1664 |
| 2022/0150011 | A1* | 5/2022 | Kim | H04L 1/0067 |

OTHER PUBLICATIONS

Interdigital Inc: "DCI Design for Multi-TRP/Panel Transmission for DL", 3GPP Draft, 3GPP TSG RAN WG1 Meeting #90, R1-1714138 DCI Design for Multi-TRP Panel Transmission for DL, 3rd Generation Partnership Project (3GPP), Mobile Competence Centre, 650, Route Des Lucioles, F-06921 Sophia-Antipolis Cede, vol. RAN WG1, No. Prague, Czech Republic, Aug. 21, 2017-Aug. 25, 2017, Aug. 20, 2017 (Aug. 20, 2017), XP051316927, 3 Pages, Retrieved from the Internet: URL:http://www.3gpp.org/ftp/Meetings_3GPP_SYNC/RAN1/Docs/ [retrieved on Aug. 20, 2017], Section 2, paragraph [0002], figure 1.
International Search Report and Written Opinion—PCT/US2021/034097—ISA/EPO—dated Oct. 11, 2021.
Lenovo, et al., "Remaining Issues on Multi-TRP/Panel Transmission", 3GPP Draft, 3GPP TSG RAN WG1 Meeting #100bis, R1-2001971, 3rd Generation Partnership Project (3GPP), Mobile Competence Centre, 650, Route Des Lucioles, F-06921, Sophia-Antipolis Cedex, France, vol. RAN WG1, No. Online Meeting, Apr. 20, 2020-Apr. 30, 2020, Apr. 10, 2020 (Apr. 10, 2020), XP051873389, 11 Pages, Retrieved from the internet: URL: https://ftp.3gpp.org/tsg_ran/WG1_RL1/TSGR1_100b_e/Docs/R1-2001971.zip. R1-2001971 Remaining issues on multi-TRP transmission_final. docx [retrieved on Apr. 10, 2020] sections 1-4, figure 1, chapter 2.4, paragraph [0002], figure 1.
Qualcomm Incorporated: "Multi-TRP Enhancements", 3GPP Draft, 3GPP TSG RAN WG1 #101-e, R1-2004463, 3rd Generation Partnership Project (3GPP), Mobile Competence Centre, 650, Route Des Lucioles, F-06921, Sophia-Antipolis Cedex, France, vol. RAN WG1, No. May 25, 2020-Jun. 5, 2020, May 16, 2020 (May 16, 2020), XP051886192, 11 pages, Retrieved from the Internet: URL: https://ftp.3gpp.org/tsg_ran/WG1_RL1/TSGR1_101-e/Docs/R1-2004463.zip R1-2004463 Multi-TRP Enhancements.docx [retrieved on May 16, 2020] paragraph [0003], figure 2.
ZTE: "Enhancements on Multi-TRP/Panel Transmission", 3GPP Draft, 3GPP TSG RAN WG1 Ad-Hoc Meeting 1901, R1-1900087, Enhancements on Multi-TRP and Multi-Panel Transmission, 3rd Generation Partnership Project (3GPP). Mobile Competence Centre, 650, Route Des Lucioles, F-06921 Sophia-Antipolis vol. RAN WG1, No. Taipei, Jan. 21, 2019-Jan. 25, 2019, Jan. 20, 2019 (Jan. 20, 2019), XP051593013, pp. 1-16, Retrieved from the Internet: URL: http://www.3gpp.org/ftp/Meetings%5F3GPP%5FSYNC/RAN1/Docs/R1%2D1900087%2Ezip [retrieved on Jan. 20, 2019] Figures 2.1-5, 2.1-6, Section 2.1.2, paragraph [2.1.2], figure 2.1.

* cited by examiner

TECHNIQUES FOR MULTIPLE COMPONENT CARRIER SCHEDULING

CROSS REFERENCE

The present application for patent claims the benefit of U.S. Provisional Patent Application No. 63/052,748 by Khoshnevisan et al., entitled "TECHNIQUES FOR MULTIPLE COMPONENT CARRIER SCHEDULING," filed Jul. 16, 2020, assigned to the assignee hereof, and expressly incorporated by reference herein.

FIELD OF TECHNOLOGY

The following relates to wireless communications, including techniques for multiple component carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, downlink data transmissions from a base station to a UE may be scheduled via downlink control information (DCI) messages from the base station. A UE may be able to differentiate between transmissions from different transmission/reception points (TRPs) of a base station based on some downlink resources being associated with one TRP and other downlink resources being associated with another TRP. Transmissions from TRPs may be via resources associated with different control resource set (CORESET) groups.

SUMMARY

The described techniques relate to improved methods, systems, devices, and apparatuses that support techniques for multiple component carrier scheduling. Generally, the described techniques provide for multi-component carrier downlink scheduling of a user equipment (UE). In some aspects, downlink control information (DCI) messages may be associated with a single transmission/reception point (TRP), a single control resource set (CORESET) group, or both. Accordingly, in order to schedule multi-TRP-based downlink data transmissions over multiple component carriers, a first DCI message associated with a first TRP (e.g., first CORESET group) may schedule downlink data transmissions in two or more component carriers, and a second DCI message associated with a second TRP (e.g., second CORESET group) may schedule downlink data transmissions in two or more component carriers. In additional aspects, a single DCI message may schedule two downlink data transmissions in a single component carrier, where each downlink data transmission is associated with a different TRP (e.g., different CORESET group). The two downlink data transmissions may be scheduled on the same or a different component carrier on which the DCI message was received. In additional or alternative aspects, a single DCI message may schedule two downlink data transmissions on separate component carriers, where each downlink data transmission is associated with a different TRP (e.g., different CORESET group). In some aspects, DCI messages used to schedule downlink data transmissions may indicate associations between component carriers and TRPs (e.g., CORESET groups) via carrier indicator field (CIF) values indicating mapping pairs including corresponding component carriers and CORESET groups, where the UE is configured to interpret the CIF values via radio resource control (RRC) signaling.

A method of wireless communication at a UE is described. The method may include receiving, from a base station and on a first component carrier of a set of component carriers, one or more DCI messages scheduling downlink data transmissions at the UE, where at least one DCI message schedules two or more downlink data transmissions, determining, based on the one or more DCI messages, a first set of downlink resources and a second set of downlink resources, the first set of downlink resources being associated with a first CORESET group and the second set of downlink resources being associated with a second CORESET group, receiving one or more first downlink data transmissions on the first set of downlink resources and one or more second downlink data transmissions on the second set of downlink resources, and communicating using a first set of parameters associated with the first CORESET group and a second set of parameters associated with the second CORESET group based on receiving the one or more first downlink data transmissions and the one or more second downlink data transmissions.

An apparatus for wireless communication at a UE is described. The apparatus may include a processor, memory coupled with the processor, and instructions stored in the memory. The instructions may be executable by the processor to cause the apparatus to receive, from a base station and on a first component carrier of a set of component carriers, one or more DCI messages scheduling downlink data transmissions at the UE, where at least one DCI message schedules two or more downlink data transmissions, determine, based on the one or more DCI messages, a first set of downlink resources and a second set of downlink resources, the first set of downlink resources being associated with a first CORESET group and the second set of downlink resources being associated with a second CORESET group, receive one or more first downlink data transmissions on the first set of downlink resources and one or more second downlink data transmissions on the second set of downlink resources, and communicate using a first set of parameters associated with the first CORESET group and a second set of parameters associated with the second CORESET group based on receiving the one or more first downlink data transmissions and the one or more second downlink data transmissions.

Another apparatus for wireless communication at a UE is described. The apparatus may include means for receiving, from a base station and on a first component carrier of a set of component carriers, one or more DCI messages scheduling downlink data transmissions at the UE, where at least one DCI message schedules two or more downlink data transmissions, determining, based on the one or more DCI messages, a first set of downlink resources and a second set of downlink resources, the first set of downlink resources being associated with a first CORESET group and the second set of downlink resources being associated with a second CORESET group, receiving one or more first downlink data transmissions on the first set of downlink resources and one or more second downlink data transmissions on the second set of downlink resources, and communicating using a first set of parameters associated with the first CORESET group and a second set of parameters associated with the second CORESET group based on receiving the one or more first downlink data transmissions and the one or more second downlink data transmissions.

A non-transitory computer-readable medium storing code for wireless communication at a UE is described. The code may include instructions executable by a processor to receive, from a base station and on a first component carrier of a set of component carriers, one or more DCI messages scheduling downlink data transmissions at the UE, where at least one DCI message schedules two or more downlink data transmissions, determine, based on the one or more DCI messages, a first set of downlink resources and a second set of downlink resources, the first set of downlink resources being associated with a first CORESET group and the second set of downlink resources being associated with a second CORESET group, receive one or more first downlink data transmissions on the first set of downlink resources and one or more second downlink data transmissions on the second set of downlink resources, and communicate using a first set of parameters associated with the first CORESET group and a second set of parameters associated with the second CORESET group based on receiving the one or more first downlink data transmissions and the one or more second downlink data transmissions.

In some examples of the method, apparatuses, and non-transitory computer-readable medium described herein, receiving the one or more DCI messages may include operations, features, means, or instructions for receiving, from the base station, a first DCI message in a first CORESET of the first CORESET group, the first DCI message including an indication of the first set of downlink resources, and receiving, from the base station, a second DCI message in a second CORESET of the second CORESET group, the second DCI message including an indication of the second set of downlink resources.

In some examples of the method, apparatuses, and non-transitory computer-readable medium described herein, determining the first set of downlink resources and the second set of downlink resources further may include operations, features, means, or instructions for determining that the first set of downlink resources associated with the first CORESET group includes first and second subsets of the first set of downlink resources within different component carriers, and determining that the second set of downlink resources associated with the second CORESET group includes first and second subsets of the second set of downlink resources within different component carriers.

In some examples of the method, apparatuses, and non-transitory computer-readable medium described herein, receiving the one or more DCI messages may include operations, features, means, or instructions for receiving, from the base station via the first component carrier, a single DCI message that includes an indication of the first CORESET group and the second CORESET group.

Some examples of the method, apparatuses, and non-transitory computer-readable medium described herein may further include operations, features, means, or instructions for receiving, from the base station, a RRC message indicating a set of CIF values, with each CIF value being associated with a mapping pair including a component carrier of the set of component carriers and at least one of the first CORESET group or the second CORESET group, where receiving the one or more first downlink data transmissions and the one or more second downlink data transmissions may be based on a value of a CIF in the single DCI message and the set of CIF values in the RRC message.

In some examples of the method, apparatuses, and non-transitory computer-readable medium described herein, the value of the CIF in the single DCI message may be associated with both the first CORESET group and the second CORESET group.

In some examples of the method, apparatuses, and non-transitory computer-readable medium described herein, receiving the one or more first downlink data transmissions and the one or more second downlink data transmissions may include operations, features, means, or instructions for receiving the one or more first downlink data transmissions and the one or more second downlink data transmissions over the first component carrier in accordance with the value of the CIF in the single DCI message.

In some examples of the method, apparatuses, and non-transitory computer-readable medium described herein, receiving the one or more first downlink data transmissions and the one or more second downlink data transmissions may include operations, features, means, or instructions for receiving the one or more first downlink data transmissions on the first set of downlink resources associated with the first CORESET group over a second component carrier different from the first component carrier in accordance with a first mapping pair of the value of the CIF in the single DCI message, where the first mapping pair includes the second component carrier and the first CORESET group, and receiving the one or more second downlink data transmissions on the second set of downlink resources associated with the second CORESET group over the second component carrier in accordance with a second mapping pair of the value of the CIF in the single DCI message, where the second mapping pair includes the second component carrier and the second CORESET group.

Some examples of the method, apparatuses, and non-transitory computer-readable medium described herein may further include operations, features, means, or instructions for receiving, from the base station, a RRC message indicating a set of CIF values, with each CIF value being associated with two mapping pairs of component carrier and CORESET group values, each mapping pair including a different CORESET group from either the first CORESET group or the second CORESET group, and each mapping pair including a different component carrier from the set of component carriers, where receiving the one or more first downlink data transmissions and the one or more second downlink data transmissions may be based on a value of a CIF in the single DCI message and the set of CIF values in the RRC message.

In some examples of the method, apparatuses, and non-transitory computer-readable medium described herein, receiving the one or more first downlink data transmissions and the one or more second downlink data transmissions may include operations, features, means, or instructions for receiving the one or more first downlink data transmissions on the first set of downlink resources associated with the first CORESET group over the first component carrier in accordance with a first mapping pair of the value of the CIF in the single DCI message; where the first mapping pair includes the first component carrier and the first CORESET group, and receiving the one or more second downlink data transmissions on the second set of downlink resources associated with the second CORESET group over a second component carrier different from the first component carrier in accordance with a second mapping pair of the value of the CIF in the single DCI message, where the second mapping pair includes the second component carrier and the second CORESET group.

In some examples of the method, apparatuses, and non-transitory computer-readable medium described herein, a hybrid automatic repeat request (HARD) configuration, a physical downlink shared channel (PDSCH) scrambling sequence, a cell-specific reference signal (CRS) rate matching configuration, a transmission configuration indicator (TCI) state, or any combination thereof.

A method of wireless communication at a base station is described. The method may include determining a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmitting, to the UE and on a first component carrier of the set of component carriers, one or more DCI messages scheduling downlink data transmissions at the UE, where at least one DCI schedules two or more downlink data transmissions, transmitting, to the UE, one or more first downlink data transmissions on the first set of downlink resources and one or more second downlink data transmissions on the second set of downlink resources based on the one or more DCI messages, and communicating, with the UE, using a first set of parameters associated with the first CORESET group and a second set of parameters associated with the second CORESET group.

An apparatus for wireless communication at a base station is described. The apparatus may include a processor, memory coupled with the processor, and instructions stored in the memory. The instructions may be executable by the processor to cause the apparatus to determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmit, to the UE and on a first component carrier of the set of component carriers, one or more DCI messages scheduling downlink data transmissions at the UE, where at least one DCI schedules two or more downlink data transmissions, transmit, to the UE, one or more first downlink data transmissions on the first set of downlink resources and one or more second downlink data transmissions on the second set of downlink resources based on the one or more DCI messages, and communicate, with the UE, using a first set of parameters associated with the first CORESET group and a second set of parameters associated with the second CORESET group.

Another apparatus for wireless communication at a base station is described. The apparatus may include means for determining a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmitting, to the UE and on a first component carrier of the set of component carriers, one or more DCI messages scheduling downlink data transmissions at the UE, where at least one DCI schedules two or more downlink data transmissions, transmitting, to the UE, one or more first downlink data transmissions on the first set of downlink resources and one or more second downlink data transmissions on the second set of downlink resources based on the one or more DCI messages, and communicating, with the UE, using a first set of parameters associated with the first CORESET group and a second set of parameters associated with the second CORESET group.

A non-transitory computer-readable medium storing code for wireless communication at a base station is described. The code may include instructions executable by a processor to determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmit, to the UE and on a first component carrier of the set of component carriers, one or more DCI messages scheduling downlink data transmissions at the UE, where at least one DCI schedules two or more downlink data transmissions, transmit, to the UE, one or more first downlink data transmissions on the first set of downlink resources and one or more second downlink data transmissions on the second set of downlink resources based on the one or more DCI messages, and communicate, with the UE, using a first set of parameters associated with the first CORESET group and a second set of parameters associated with the second CORESET group.

In some examples of the method, apparatuses, and non-transitory computer-readable medium described herein, transmitting the one or more DCI messages may include operations, features, means, or instructions for transmitting, to the UE, a first DCI message in a first CORESET of the first CORESET group, the first DCI message including an indication of the first set of downlink resources, and transmitting, to the UE, a second DCI message in a second CORESET of the second CORESET group, the second DCI message including an indication of the second set of downlink resources.

In some examples of the method, apparatuses, and non-transitory computer-readable medium described herein, determining the first set of downlink resources and the second set of downlink resources further may include operations, features, means, or instructions for determining that the first set of downlink resources associated with the first CORESET group includes first and second subsets of the first set of downlink resources within different component carriers, and determining that the second set of downlink resources associated with the second CORESET group includes first and second subsets of the second set of downlink resources within different component carriers.

In some examples of the method, apparatuses, and non-transitory computer-readable medium described herein, transmitting the one or more DCI messages may include operations, features, means, or instructions for transmitting, to the UE via the first component carrier, a single DCI message that includes an indication of the first CORESET group and the second CORESET group.

Some examples of the method, apparatuses, and non-transitory computer-readable medium described herein may further include operations, features, means, or instructions for transmitting, to the UE, a RRC message indicating a set of CIF values, with each CIF value being associated with a mapping pair including a component carrier of the set of component carriers and at least one of the first CORESET group or the second CORESET group, where transmitting the one or more first downlink data transmissions and the one or more second downlink data transmissions may be based on a value of a CIF in the single DCI message and the set of CIF values in the RRC message.

In some examples of the method, apparatuses, and non-transitory computer-readable medium described herein, the value of the CIF in the single DCI message may be associated with both the first CORESET group and the second CORESET group.

In some examples of the method, apparatuses, and non-transitory computer-readable medium described herein, transmitting the one or more first downlink data transmissions and the one or more second downlink data transmissions may include operations, features, means, or instructions for transmitting the one or more first downlink data transmissions and the one or more second downlink data transmissions over the first component carrier in accordance with the value of the CIF in the single DCI message.

In some examples of the method, apparatuses, and non-transitory computer-readable medium described herein, transmitting the one or more first downlink data transmissions and the one or more second downlink data transmissions may include operations, features, means, or instructions for transmitting the one or more first downlink data transmissions on the first set of downlink resources associated with the first CORESET group over a second component carrier different from the first component carrier in accordance with a first mapping pair of the value of the CIF in the single DCI message, where the first mapping pair includes the second component carrier and the first CORESET group, and transmitting the one or more second downlink data transmissions on the second set of downlink resources associated with the second CORESET group over the second component carrier, in accordance with a second mapping pair of the value of the CIF in the single DCI message, where the second mapping pair includes the second component carrier and the second CORESET group.

Some examples of the method, apparatuses, and non-transitory computer-readable medium described herein may further include operations, features, means, or instructions for transmitting, to the UE, a RRC message indicating a set of CIF values, with each CIF value being associated with two mapping pairs of component carrier and CORESET group values, each mapping pair including a different CORESET group from either the first CORESET group or the second CORESET group, and each mapping pair including a different component carrier from the set of component carriers, where transmitting the one or more first downlink data transmissions and the one or more second downlink data transmissions may be based on a value of a CIF in the single DCI message and the set of CIF values in the RRC message.

In some examples of the method, apparatuses, and non-transitory computer-readable medium described herein, transmitting the one or more first downlink data transmissions and the one or more second downlink data transmissions may include operations, features, means, or instructions for transmitting the one or more first downlink data transmissions on the first set of downlink resources associated with the first CORESET group over the first component carrier in accordance with a first mapping pair of the value of the CIF in the single DCI message, where the first mapping pair includes the first component carrier and the first CORESET group, and transmitting the one or more second downlink data transmissions on the second set of downlink resources associated with the second CORESET group over a second component carrier different from the first component carrier in accordance with a second mapping pair of the value of the CIF in the single DCI message, where the second mapping pair includes the second component carrier and the second CORESET group.

In some examples of the method, apparatuses, and non-transitory computer-readable medium described herein, a HARQ configuration, a PDSCH scrambling sequence, a CRS rate matching configuration, a TCI state, or any combination thereof.

DETAILED DESCRIPTION

Figure 1:
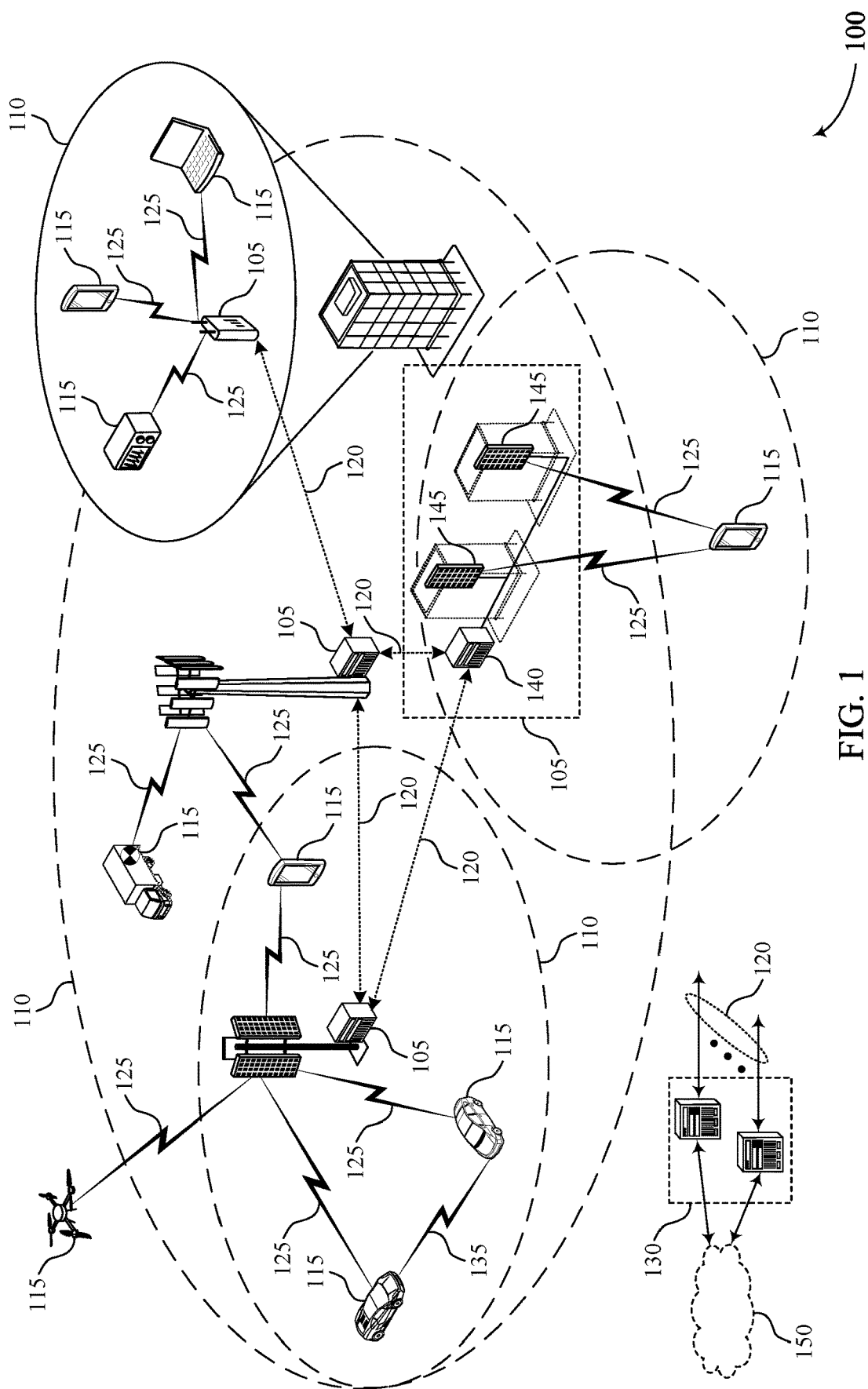
FIG. 1 illustrates an example of a wireless communications system that supports techniques for multiple component carrier scheduling in accordance with aspects of the present disclosure.

In some wireless communications systems, downlink data transmissions (e.g., physical downlink shared channel (PDSCH) transmissions) from a base station to a user equipment (UE) may be scheduled via downlink control information (DCI) messages from the base station. A UE may be able to differentiate between transmissions from different transmission/reception points (TRPs) of a base station based on sets of downlink resources being associated with different TRPs. Downlink data transmissions from one TRP may be transmitted via a set of downlink resources associated with a first control resource set (CORESET) group (e.g., CORESETPoolIndex 0), while downlink data transmissions from another TRP may be transmitted via a set of downlink resources associated with a second CORESET group (e.g., CORESETPoolIndex 1). Associations between downlink data transmissions and the respective CORESET groups (and therefore TRPs) may be indicated via the scheduling DCI message. In some cases, a single DCI message may indicate PDSCH resources for multiple TRPs, and a single DCI message may indicate PDSCH resources on different component carriers. However, some wireless communications systems are unable to schedule downlink data transmissions for multiple TRPs (e.g., multiple downlink data transmissions associated with multiple CORESET groups) across multiple component carriers.

To address limitations related to scheduling downlink data transmissions associated with multiple CORESET groups (e.g., multiple TRPs) across multiple component carriers, techniques for multi-component carrier downlink scheduling are described. In some aspects, DCI messages may be associated with a single TRP, a single CORESET group, or both. Accordingly, in order to schedule multi-TRP-based downlink data transmissions over multiple component carriers, a first DCI message associated with a first TRP (e.g., first CORESET group, CORESETPoolIndex 0) may schedule downlink data transmissions in two or more component carriers, and a second DCI message associated with a second TRP (e.g., second CORESET group, CORESETPoolIndex 1) may schedule downlink data transmissions in two or more component carriers.

In additional aspects, a single DCI message may schedule two downlink data transmissions in a single component carrier, where each downlink data transmission is associated with a different TRP (e.g., different CORESET group). The two downlink data transmissions may be scheduled on the same or a different component carrier on which the DCI message was received. In additional or alternative aspects, a single DCI message may schedule two downlink data transmissions on separate component carriers, where each downlink data transmission is associated with a different TRP (e.g., different CORESET group). In some aspects, DCI messages used to schedule downlink data transmissions may indicate associations between component carriers and TRPs (e.g., CORESET groups) via carrier indicator field (CIF) values indicating mapping pairs including corresponding component carriers and CORESET groups, where the UE may be configured to interpret the CIF values via radio resource control (RRC) signaling.

Aspects of the disclosure are initially described in the context of wireless communications systems. Aspects of the disclosure are additionally described in the context of example resource configurations and an example process flow. Aspects of the disclosure are further illustrated by and described with reference to apparatus diagrams, system diagrams, and flowcharts that relate to techniques for multiple component carrier scheduling.

FIG. 1 illustrates an example of a wireless communications system 100 that supports techniques for multiple component carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink data transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink data transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for multi-component carrier downlink scheduling. In particular, techniques described herein may enable one or more DCI messages to schedule multiple downlink data transmissions at a UE, where the multiple downlink data transmissions are associated with one or more TRPs (e.g., multiple CORESET groups) and are received across one or more component carriers. By enabling DCI messages to schedule downlink data transmissions for multiple TRPs (e.g., multiple CORESET groups) across one or more component carriers, techniques described herein may reduce control signaling overhead associated with downlink scheduling within the wireless communications system 100, and may enable more flexible use of communication resources.

For example, in some aspects, a base station 105 of the wireless communications system 100 may transmit a first DCI message and a second DCI message to a UE 115. The first DCI message may be associated with a first TRP of the base station 105, and the second DCI message may be associated with a second TRP of the base station 105. In this regard, the first DCI message may be received in a CORESET of the first CORESET group (e.g., CORESETPoolIndex 0) associated with the first TRP, and the second DCI message may be received in a second CORESET of the second CORESET group (e.g., CORESETPoolIndex 1) associated with the second TRP. In this example, the first DCI message may schedule a first downlink data transmission (e.g., PDSCH transmission) at the UE 115 in a first component carrier and a second downlink data transmission in a second component carrier, where the first downlink data transmission and the second downlink data transmission are associated with the first CORESET group (e.g., first TRP). Similarly, the second DCI message may schedule a third downlink data transmission and a fourth downlink data transmission associated with the second CORESET group (e.g., second TRP). The third and fourth downlink data transmissions may be scheduled for the same or different component carriers as the first downlink data transmission and the second downlink data transmission. For instance, the third downlink data transmission may be scheduled on the second component carrier, ant the fourth downlink data transmission may be scheduled on a fourth component carrier. In some aspects, the DCI message may schedule downlink data transmissions on the same or different component carrier as the component carrier on which the DCI message was transmitted to the UE 115.

In additional or alternative aspects, a single DCI may be used to schedule multiple downlink data transmissions associated with multiple CORESET groups (e.g., multiple TRPs) across one or more component carriers. For example, in some cases, the base station 105 may transmit a single DCI message to the UE 115. In this example, the single DCI message may schedule a first downlink data transmission and a second downlink data transmission in a single component carrier, where the first downlink data transmission is associated with a first CORESET group (e.g., first TRP), and the second downlink data transmission is associated with a second CORESET group (e.g., second TRP). Moreover, the first and second downlink data transmissions may be scheduled for the same or different component carrier as the component carrier on which the single DCI message was received.

In additional or alternative cases, the single DCI message transmitted to the UE 115 may be used to schedule multiple downlink data transmissions associated with different CORESET groups (e.g., different TRPs) across multiple component carriers. For example, the single DCI message may schedule a first downlink data transmission associated with a first CORESET group (e.g., first TRP) on a first component carrier, and may additionally schedule a second downlink data transmission associate with a second CORESET group (e.g., second TRP) on a second component carrier. In this example, the first downlink data transmission or the second downlink data transmission may be scheduled on the same or different component carrier as the component carrier on which the single DCI message was received.

In some aspects, the UE 115 of the wireless communications system 100 may be preconfigured to interpret DCI messages received from the base station 105 as scheduling multiple downlink data transmission associated with given CORESET groups. For example, the base station 105 may transmit RRC signaling to the UE 115, where the RRC signaling includes CIF values indicating associations between component carriers and TRPs (e.g., CORESET groups). In particular, the CIF values may indicate one or more mapping pairs, where each mapping pair indicates an association between a given component carrier and a given CORESET group. In this regard, the CIF values indicated in RRC signaling may provide a set of indices indicating TRP-component carrier mapping pairs. Subsequently, the DCI messages received from the base station 105 may include an indication of a CIF value (e.g., an index, or mapping pair) which corresponds to one or more indexes or mapping pairs of the set of indices indicated via the RRC signaling. Accordingly, the UE 115 may be configured to monitor sets of downlink resources across determined component carriers based on the CIF values (e.g., set of indices, set of mapping pairs) indicated in the RRC signaling and the CIF value (e.g., index or mapping pair) indicated in the received DCI messages.

Techniques described herein may enable multiple downlink data transmissions associated with given CORESET groups to be scheduled within or across multiple component carriers via one or more DCI messages. In particular, a DCI message may be configured to schedule multiple downlink data transmissions associated with one or more CORESET groups (e.g., CORESETPoolIndex 0, CORESETPoolIndex 1) within a single component carrier, across multiple component carriers, or both. By enabling the scheduling of multiple downlink data transmissions associated with CORESET groups with a single DCI message, control signaling overhead within the wireless communications system 100 may be reduced, and flexibility of scheduling downlink data transmissions may be improved.

Figure 2:
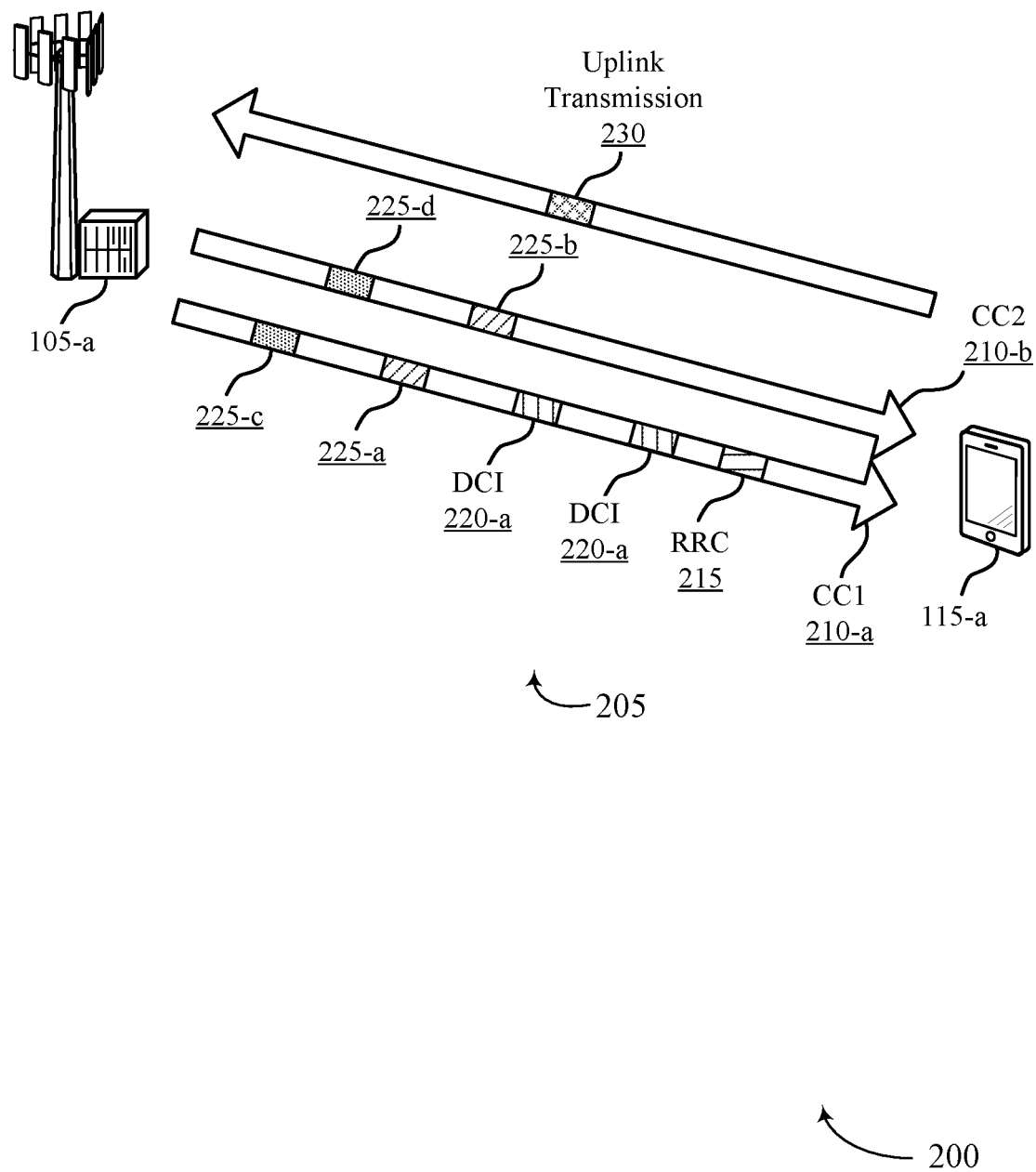
FIG. 2 illustrates an example of a wireless communications system that supports techniques for multiple component carrier scheduling in accordance with aspects of the present disclosure.

FIG. 2 illustrates an example of a wireless communications system 200 that supports techniques for multiple component carrier scheduling in accordance with aspects of the present disclosure. In some examples, wireless communications system 200 may implement aspects of wireless communications system 100. The wireless communications system 200 may include a base station 105-*a* and a UE 115-*a*, which may be examples of UEs 115 and base stations 105, as described with reference to FIG. 1.

The UE 115-*a* may communicate with the base station 105-*a* using a communication link 205. In some cases, the communication link 205 may include an example of an access link (e.g., a Uu link). The communication link 205 may include a bi-directional link that can include both uplink and downlink communication. In one aspect, the UE 115-*a* may transmit uplink transmissions, such as uplink messages or uplink signals, to the base station 105-*a* using the communication link 205 and the base station 105-*a* may transmit downlink data transmissions, such as downlink messages or downlink signals, to the UE 115-*a* using the communication link 205. In some aspects, the communication link 205 may include a set of component carriers 210 for communications between the UE 115-*a* and the base station 105-*a*. For example, the communication link 205 may include a first component carrier 210-*a* (CC1) and a second component carrier 210-*b* (CC2). The communication link 205 may include any number of component carriers.

As noted previously herein, a UE may be able to differentiate between transmissions from different TRPs of a base station based on sets of downlink resources being associated with different TRPs. Downlink data transmissions from one TRP may be transmitted via a set of downlink resources associated with a first CORESET group (e.g., CORESETPoolIndex 0), while downlink data transmissions from another TRP may be transmitted via a set of downlink resources associated with a second CORESET group (e.g., CORESETPoolIndex 1). In some aspects, each CORESET group may each include two CORESETs. For example, the first CORESET group may include a first CORESET and a second CORESET, and the second CORESET group may include a third CORESET and a fourth CORESET. Associations between downlink data transmissions and the respective CORESET groups (and therefore TRPs) may be indicated via the scheduling DCI message. Additionally or alternatively, associations between downlink data transmissions and the respective CORESET groups may be determined based on the CORESET group on which respective DCI messages were received in conjunction with CIF values indicated in the DCI messages.

The UE 115-*a* and the base station 105-*a* of the wireless communications system 200 may support techniques for multi-component carrier downlink scheduling. In particular, techniques described herein may enable one or more DCI messages to schedule multiple downlink data transmissions at a UE, where the multiple downlink data transmissions are associated with one or more TRPs (e.g., multiple CORESET groups) and are received across one or more component carriers. By enabling DCI messages to schedule downlink data transmissions for multiple TRPs (e.g., multiple CORESET groups) across multiple component carriers, techniques described herein may reduce control signaling overhead associated with downlink scheduling within the wireless communications system 100, and may enable more flexible use of communication resources.

For example, the base station 105-*a* may determine a first set of downlink resources, where the first set of downlink resources may be associated with a first CORESET group (e.g., CORESETPoolIndex 0). In this regard, the first set of downlink resources may be associated with a first TRP of the base station 105-*a*. The first set of downlink resources may include a set of time resources and a set of frequency resources to be used by the UE 115-*a*. The first set of downlink resources may be associated with one or more component carriers 210 used in communications between the UE 115-*a* and the base station 105-*a*. In some aspects, the base station 105-*a* may additionally determine a first set of parameters associated with the first set of downlink resources, the first CORESET group (e.g., first TRP), or both.

In some aspects, the first set of downlink resources may include downlink resources in one or more component carriers 210. For example, the first set of downlink resources may include time and frequency resources within a single component carrier 210 (e.g., first component carrier 210-*a* or second component carrier 210-*b*) of the UE 115-*a*. By way of another example, the first set of downlink resources may include time and frequency resources in both the first component carrier 210-*a* and a second component carrier 210-*b*. In this example, the first set of downlink resources may include a first subset of downlink resources associated with the first component carrier 210-*a*, and a second subset of downlink resources associated with the second component carrier 210-*b*.

Similarly, the base station 105-*a* may determine a second set of downlink resources, where the second set of downlink resources may be associated with a second CORESET group (e.g., CORESETPoolIndex 1). In this regard, the second set of downlink resources may be associated with a second TRP of the base station 105. The second set of downlink resources may include a set of time resources and a set of frequency resources to be used by the UE 115-a. Moreover, the second set of downlink resources may be different from the first set of downlink resources in the time domain, the frequency domain, or both.

In some aspects, the second set of downlink resources may include downlink resources in one or more component carriers 210. For example, the second set of downlink resources may include time and frequency resources within a single component carrier 210 (e.g., first component carrier 210-a or second component carrier 210-b) of the UE 115-a. By way of another example, the second set of downlink resources may include time and frequency resources in the first component carrier 210-a and the second component carrier 210-b. In this example, the second set of downlink resources may include a first subset of downlink resources associated with the first component carrier 210-a, and a second subset of downlink resources associated with the second component carrier 210-b. In some aspects, the second set of downlink resources may include a subset of downlink resources on one or more component carriers 210 associated with the first set of downlink resources.

In some aspects, the base station 105-a may additionally determine sets of parameters used for communicating with the UE 115-a associated with the first and second sets of downlink resources. In this regard, the base station 105-a may determine a first set of parameters associated with the first set of downlink resources, and a second set of parameters associated with the second set of downlink resources. The second set of parameters may be different from the first set of parameters. The parameters included within the respective sets of parameters may include, but are not limited to, HARQ configurations, PDSCH scrambling sequences, CRS rate matching configurations, transmission configuration indicator (TCI) states, or any combination thereof.

In some aspects, the base station 105-a may transmit an RRC message 215 to the UE 115-a. The RRC message 215 may be transmitted on the first component carrier 210-a, the second component carrier 210-b, or both. For example, as shown in FIG. 2, the RRC message 215 may be transmitted via the first component carrier 210-a. In some aspects, the base station 105-a may transmit the RRC message 215 based on determining the first set of downlink resources associated with the first CORESET group (e.g., first TRP), determining the second set of downlink resources associated with the second CORESET group (e.g., second TRP), or both. In some aspects, the RRC message 215 may indicate an association between one or more CORESET groups and one or more component carriers 210 of the UE 115-a. For example, the RRC message 215 may indicate that the first CORESET group (e.g., CORESETPoolIndex 0) is associated with the first component carrier 210-a and the second component carrier 210-a, and may further indicate that the second CORESET group (e.g., CORESETPoolIndex 1) is associated with the first component carrier 210-a and a second component carrier 210-b. By way of another example, the RRC message 215 may indicate that the first CORESET group, the second CORESET group, or both, is associated with a third component carrier (not shown).

In additional or alternative aspects, the RRC message 215 may indicate associations between CORESET groups (e.g., TRPs) and component carriers 210 via one or more CIF values. In particular, the one or more CIF values may indicate one or more mapping pairs, where each mapping pair includes a component carrier and a CORESET group. In this regard, CIF values indicated in the RRC message 215 may be associated with one or more component carriers 210, one or more CORESET groups, or both. For example, in some cases, the RRC message 215 may include a set of CIF values, where a first CIF value indicates a first mapping pair including the first component carrier 210-a and the first CORESET group. In this example, the first mapping pair indicated in the first CIF value may indicate that the first component carrier 210-a is associated with the first CORESET group (e.g., CIF 1={CC1, CORESETPoolIndex 0}). Thus, the first mapping pair indicated in the first CIF (e.g., CIF 1) may include {CC1, CORESETPoolIndex 0}. Similarly, the RRC message 215 may include a second CIF value which indicates a second mapping pair including the second component carrier 210-b and the first CORESET group. In this example, the second mapping pair indicated in the second CIF value may indicate that the second component carrier 210-b is associated with the first CORESET group (e.g., CIF 2={CC2, CORESETPoolIndex 0}). Thus, the second mapping pair indicated in the second CIF (e.g., CIF 2) may include {CC2, CORESETPoolIndex 0}.

By way of another example, a third CIF value may indicate a third mapping pair including the first component carrier 210-a and the second CORESET group. In this example, the third CIF value indicated in the RRC message 215 may indicate that the first component carrier 210-a is associated with the second CORESET group (e.g., CIF 3={CC1, CORESETPoolIndex 1}). Thus, the third mapping pair indicated in the third CIF (e.g., CIF 3) may include {CC1, CORESETPoolIndex 1}. It is noted herein that the RRC message 215 may include any number of CIF values, where each CIF value includes a mapping pair indicating an association between a component carrier 210 and a CORESET group.

Additionally or alternatively, each CIF value indicated within the RRC message 215 may be associated with two mapping pairs indicating two separate associations between a component carrier 210 and a CORESET groups. For example, a first CIF value may include two mapping pairs indicating that the first component carrier 210-a is associated with the first CORESET group and the second CORESET group (e.g., CIF 1=({CC1, CORESETPoolIndex 0}, {CC1, CORESETPoolIndex 1})). In this example, the first CIF (e.g., CIF 1) includes a first mapping pair {CC1, CORESETPoolIndex 0} including the first component carrier 210-a and the first CORESET group, and a second mapping pair {CC1, CORESETPoolIndex 1} including the first component carrier 210-a and the and the second CORESET group.

By way of another example, a second CIF value may include two mapping pairs indicating that the first component carrier 210-a is associated with first CORESET group and that the second component carrier 210-b is associated with the second CORESET group (e.g., CIF 2=({CC1, CORESETPoolIndex 0}, {CC2, CORESETPoolIndex 1})). In this example, the second CIF (e.g., CIF 2) includes a first mapping pair {CC1, CORESETPoolIndex 0} including the first component carrier 210-a and the first CORESET group, and a second mapping pair {CC2, CORESETPoolIndex 1} including the second component carrier 210-b and the and the second CORESET group.

In some aspects, a CIF value may indicate that both the first CORESET group and the second CORESET group are associated with the same component carrier 210 using a single mapping pair. For example, in some cases, a CIF value indicated in the RRC message 215 may indicate a mapping pair including the first component carrier 210-a and a third CORESET group (e.g., CORESETPoolIndex 2)

(e.g., CIF={CC1, CORESETPoolIndex 2}). In this example, the indication of the third CORESET group within the mapping pair may indicate that both the first CORESET group and the second CORESET group are associated with the first component carrier 210-b.

In some aspects, the base station 105-a may transmit a first DCI message 220-a to the UE 115-a, where the first DCI message 220-a schedules downlink data transmissions 225 at the UE 115-a. The base station 105-a may transmit the first DCI message 220-a on the first component carrier 210-a, the second component carrier 210-b, a third component carrier (not shown), or any combination thereof. In some aspects, the base station 105-a may transmit the first DCI message 220-a based on determining the first set of downlink resources associated with the first CORESET group, determining the second set of downlink resources associated with the second CORESET group, transmitting the RRC message 215, or any combination thereof. Similarly, the UE 115-a may receive the first DCI message 220-a based on receiving the RRC message 215.

In some aspects, the first DCI message 220-a may indicate the first set of downlink resources, the second set of downlink resources, or both. Additionally or alternatively, the first DCI message 220-a may be associated with one or more component carriers 210, one or more CORESET groups, or both. For example, the first DCI message 220-a may be transmitted in the first CORESET group, the second CORESET group, or both. For instance, the first DCI message 220-a may be transmitted in the first CORESET group, and may thereby include an indication of the first set of downlink resources associated with the first CORESET group. By way of another example, the first DCI message 220-a may be transmitted in the second CORESET group, and may thereby include an indication of the second set of downlink resources associated with the second CORESET group.

In some cases, the first DCI message 220-a may include a value of a CIF, where the value of the CIF corresponds to one or more CIF values indicated in the RRC message 215. In this regard, the first DCI message 220-a may include a CIF indicating one or more mapping pairs, where each mapping pair indicates an association between a component carrier and one or more CORESET groups. In this regard, the CIF values indicated in the RRC message 215 may indicate a set of indices corresponding to mapping pairs of component carriers and CORESET groups (e.g., {CC1, CORESETPoolIndex 0}, {CC2, CORESETPoolIndex 0}), and the values of the CIF indicated in the first DCI message 220-a may indicate an index which corresponds to an index of the set of indices indicated in the RRC message 215. Accordingly, the value of the CIF indicated in the first DCI message 220-a may indicate one or more mapping pairs (e.g., associations between component carriers 210 and CORESET groups) which are to be used by the UE 115-a. In some aspects, the one or more values of the CIF indicated in the first DCI message 220-a may be associated with the first CORESET group, the second CORESET group, or both. For example, in some cases, the one or more values of the CIF indicated in the first DCI message 220-a may indicate associations between the first CORESET group and one or more component carriers 210, and associations between the second CORESET group and one or more component carriers 210.

In some cases, the base station 105-a may additionally transmit a second DCI message 220-b to the UE 115-a, where the second DCI message 220-b schedules downlink data transmissions 225 at the UE 115-a. The base station 105-a may transmit the second DCI message 220-b on the first component carrier 210-a, the second component carrier 210-b, a third component carrier (not shown), or any combination thereof. In some aspects, the base station 105-a may transmit the second DCI message 220-b based on determining the first set of downlink resources associated with the first CORESET group, determining the second set of downlink resources associated with the second CORESET group, transmitting the RRC message 215, transmitting the first DCI message 220-a, or any combination thereof. Similarly, the UE 115-a may receive the second DCI message 220-b based on receiving the RRC message 215, receiving the first DCI message 220-a, or both.

In some cases, the second DCI message 220-b may be transmitted in the first CORESET group, the second CORESET group, or both. For example, in cases where the first DCI message 220-a is transmitted in the first CORESET group (e.g., CORESETPoolIndex 0), the second DCI message 220-b may be transmitted in the second CORESET group (e.g., CORESETPoolIndex 1). In this regard, the first DCI message 220-a may be associated with the first TRP of the base station 105-a and may indicate the first set of downlink resources, and the second DCI message 220-b may be associated with the second TRP of the base station 105-b and may indicate the second set of downlink resources.

By way of another example, the first DCI message 220-a may be transmitted in the second CORESET group (e.g., CORESETPoolIndex 1), and the second DCI message 220-b may be transmitted in the first CORESET group (e.g., CORESETPoolIndex 0). In this example, the first DCI message 220-a may include an indication of the second set of downlink resources associated with the second CORESET group, and the second DCI message 220-b may include an indication of the first set of downlink resources associated with the first CORESET group.

As noted previously herein, the second DCI message 220-b may indicate CORESET groups and/or component carriers 210 to be used for communications at the UE 115-a via a value indicated in a CIF of the respective DCI messages 220. For example, the second DCI message 220-b may include an indication of a value of a CIF which includes one or more mapping pairs indicating associations between component carriers and one or more CORESET groups. In this regard, the CIF values indicated in the RRC message 215 may indicate a set of indices corresponding to mapping pairs of component carriers 210 and CORESET groups (e.g., {CORESETPoolIndex 0, CC1}, {CORESETPoolIndex 0, CC2}), and the value of the CIF indicated in the second DCI message 220-b may indicate an index (e.g., one or more mapping pairs) which corresponds to an index (e.g., one or more mapping pairs) of the set of indices indicated in the RRC message 215.

Accordingly, the values of the CIF indicated in the first DCI message 220-a, the second DCI message 220-b, or both, may indicate which CORESET group and component carrier 210 pairs are to be used by the UE 115-a when communicating with the base station 105-a. In some aspects, the values of the CIF values indicated in the first DCI message 220-a, the second DCI message 220-b, or both, may be associated with the first CORESET group, the second CORESET group, or both.

In some aspects, the UE 115-a may determine the first set of downlink resources associated with the first CORESET group (e.g., first TRP) and the second set of downlink resources associated with the second CORESET group (e.g., second TRP). In some aspects, the UE 115-b may determine the first set of downlink resources, the second set of downlink resources, or both, based on receiving the RRC message 215, receiving the first DCI message 220-*a*, receiving the second DCI message 220-*b*, or any combination thereof. For example, the UE 115-*a* may determine the first set of downlink resources, the second set of downlink resources, or both, based on an indication of the first set of downlink resources indicated in the first DCI message 220-*a*, the second DCI message 220-*b*, or both.

In some aspects, the UE 115-*b* may determine whether the first set of downlink resources, the second set of downlink resources, or both, is associated with one or more component carriers 210. For example, the UE 115-*a* may determine that the first set of downlink resources associated with the first CORESET group includes a first subset of downlink resources associated with (e.g., within) the first component carrier 210-*a*, and a second subset of downlink resources associated with (e.g., within) the second component carrier 210-*b*. Similarly, the UE 115-*a* may determine that the second set of downlink resources associated with the second CORESET group includes a first subset of downlink resources associated with (e.g., within) the first component carrier 210-*a*, and a second subset of downlink resources associated with (e.g., within) the second component carrier 210-*b*.

By way of another example, the UE 115-*a* may determine that the first set of downlink resources, the second set of downlink resources, or both, is associated with a single component carrier 210 (e.g., the first component carrier 210-*a* or the second component carrier 210-*b*). In some aspects, the UE 115-*a* may determine that the first set of downlink resources, the second set of downlink resources, or both, are associated with the same or different component carrier 210 as the component carrier 210 (e.g., first component carrier 210-*a*) on which the respective DCI messages 220-*a* and 220-*b* were received. In some aspects, the UE 115-*a* may determine associations between the first and second sets of downlink resources and one or more component carriers based on the CIF values indicated in the RRC message 215, the values of the CIF indicated in the DCI messages 220-*a* and 220-*b*, or any combination thereof.

In some aspects, the UE 115-*a* may additionally determine the first set of parameters, the second set of parameters, or both, associated with the respective sets of downlink resources. In this regard, the UE 115-*b* may determine sets of parameters (e.g., HARQ configurations, PDSCH scrambling sequences, CRS rate matching configurations, TCI states) for communications with the base station 105-*a* associated with the respective CORESET groups. The UE 115-*a* may determine the sets of parameters based on the RRC message 215, the first DCI message 220-*a*, the second DCI message 220-*b*, or any combination thereof. Moreover, in some cases, the UE 115-*a* may be preconfigured with the sets of parameters associated with the respective CORESET groups.

In some aspects, the UE 115-*a* may monitor the first set of downlink resources, the second set of downlink resources, or both, for downlink data transmissions 225. The UE 115-*a* may monitor the first set of downlink resources and/or the second set of downlink resources based on identifying the respective sets of downlink resources. For example, the UE 115-*a* may monitor one or more component carriers 210 for downlink data transmissions 225 based on the determined associations between the respective CORESET groups and one or more component carriers 210. For example, in some cases, the first DCI message 220-*a* may include one or more CIF values which indicate that both the first CORESET group and the second CORESET group are associated with the first component carrier 210-*a*. In this example, the UE 115-*a* may monitor both the first set of downlink resources associated with the first CORESET group and the second set of downlink resources associated with the second CORESET group in accordance with (e.g., based on) the one or more CIF values in the first DCI message 220-*a*.

By way of another example, the first DCI message 220-*a* may include a first CIF value which indicates that the first CORESET group is associated with the first component carrier 210-*a*, and a second CIF value which indicates that the second CORESET group is associated with the second component carrier 210-*b*. In this example, the UE 115-*a* may monitor the first set of downlink resources over the first component carrier 210-*a* in accordance with (e.g., based on) the first CIF value in the first DCI message 220-*a*, and may monitor the second set of downlink resources over the second component carrier 210-*b* in accordance with (e.g., based on) the second CIF value in the first DCI message 220-*a*.

In some aspects, the UE 115-*a* may receive downlink data transmissions 225 from the base station 105-*a*. The downlink data transmissions may include PDSCH transmissions. The UE 115-*a* may receive the downlink data transmissions 225 based on the RRC message 215, the DCI messages 220-*a* and 220-*b*, determining the first and second sets of downlink resources, monitoring the first and second sets of downlink resources, or any combination thereof. In this regard, base station 105-*a* may communicate with the UE 115-*a* (e.g., transmit/receive the one or more downlink data transmissions 225) using the first set of parameters associated with the first CORESET group, the second set of parameters associated with the second CORESET group, or both.

The downlink data transmissions 225 transmitted by the base station 105-*a* may be associated with the first CORESET group and/or the second CORESET group, and may be received across one or more component carriers 210. For example, the UE 115-*a* may receive one or more first downlink data transmissions 225 on the first set of downlink resources associated with the first CORESET group, and may receive one or more second downlink data transmissions 225 on the second set of downlink resources associated with the second CORESET group.

For instance, the first DCI message 220-*a* may indicate that the first CORESET group is associated with the both first component carrier 210-*a* and the second component carrier 210-*b*, and the second DCI message 220-*b* may indicate that the second CORESET group is associated with both the first component carrier 210-*a* and the second component carrier 210-*b*. In this example, the UE 115-*a* may receive four separate downlink data transmissions 225: a first downlink data transmission 225-*a* associated with the first CORESET group over the first component carrier 210-*a*, a second downlink data transmission 225-*b* associated with the first CORESET group over the second component carrier 210-*b*, a third downlink data transmission 225-*c* associated with the second CORESET group over the first component carrier 210-*a*, and a fourth downlink data transmission 225-*d* associated with the second CORESET group over the second component carrier 210-*b*.

By way of another example, the UE 115-*a* may receive a single DCI message 220 (e.g., first DCI message 220-*a* or second DCI message 220-*b*), where the single DCI message 220 indicates that the first CORESET group and the second CORESET group are associated with the first component carrier 210-*a*. In this example, the UE 115-*a* may receive a downlink data transmission 225-*a* associated with the first CORESET group over the first component carrier 210-a, and a downlink data transmission 225-d associated with the second CORESET group over the first component carrier 210-a. Conversely, in another example, the UE 115-a may receive a single DCI message 220 (e.g., first DCI message 220-a or second DCI message 220-b), where the single DCI message 220 indicates that the first CORESET group is associated with the first component carrier 210-a and the second CORESET group is associated with the second component carrier 210-b. In this example, the UE 115-a may receive a downlink data transmission 225-a associated with the first CORESET group over the first component carrier 210-a, and a downlink data transmission 225-d associated with the second CORESET group over the second component carrier 210-b.

In some aspects, the UE 115-a may transmit one or more uplink transmissions 230 to the base station 105-a. The UE 115-a may transmit the one or more uplink transmissions 230 based on the RRC message 215, the DCI messages 220-a and 220-b, determining the first and second sets of downlink resources, monitoring the first and second sets of downlink resources, or any combination thereof. In some aspects, the UE 115-a and the base station 105-a may communicate with one another (e.g., transmit/receive downlink data transmissions 225, transmit/receive uplink transmissions 230) using the first set of parameters associated with the first CORESET group, the second set of parameters associated with the second CORESET group, or both. For example, the UE 115-a may transmit one or more feedback messages (e.g., uplink transmissions 230) based on a HARQ configuration associated with the first set of parameters of the first CORESET group, a HARQ configuration associated with the second set of parameters of the second CORESET group, or both.

Techniques described herein may enable multiple downlink data transmissions associated with given CORESET groups to be scheduled within or across multiple component carriers via one or more DCI messages. In particular, a DCI message may be configured to schedule multiple downlink data transmissions associated with one or more CORESET groups (e.g., CORESETPoolIndex 0, CORESETPoolIndex 1) within a single component carrier, across multiple component carriers, or both. By enabling the scheduling multiple downlink data transmissions associated with CORESET groups with a single DCI message, control signaling overhead within a wireless communications system 200 may be reduced, and flexibility of scheduling downlink data transmissions may be improved.

Figure 3:
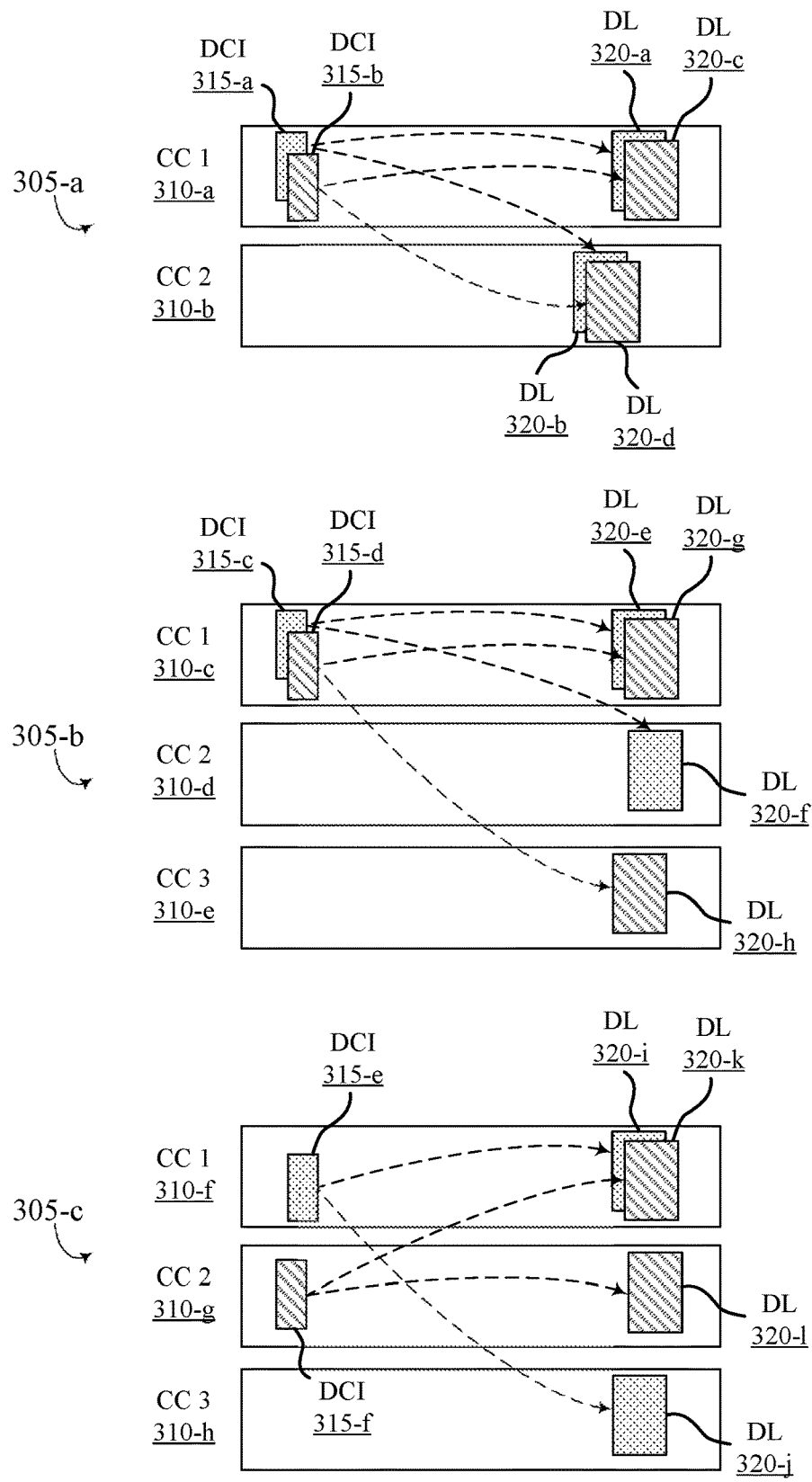
FIG. 3 illustrates an example of a resource allocation scheme that supports techniques for multiple component carrier scheduling in accordance with aspects of the present disclosure.

FIG. 3 illustrates an example of a resource allocation scheme 300 that supports techniques for multiple component carrier scheduling in accordance with aspects of the present disclosure. In some examples, resource allocation scheme 300 may implement, or be implemented by, aspects of wireless communications system 100 or 200. In some aspects, the resource allocation scheme 300 in FIG. 3 illustrates a first resource configuration 305-a, a second resource configuration 305-b, and a third resource configuration 305-c.

In some cases, as noted previously herein, each DCI message 315 (e.g., DCI messages 220-a and 220-b illustrated in FIG. 2) may schedule two separate downlink data transmissions 320 (e.g., downlink data transmissions 225 illustrated in FIG. 2) in two separate component carriers 310 (e.g., component carriers 210-a and 210-b illustrated in FIG. 2), where each of the downlink data transmissions 320 are associated with the same CORESET group. Thus, in order to schedule multi-CORESET group downlink data transmissions (e.g., multi-TRP downlink data transmissions) over multiple component carriers, two separate DCI messages 315 may be used.

For example, referring to resource configuration 305-a illustrated in FIG. 3, a base station 105 may transmit a first DCI message 315-a to a UE 115 over a first component carrier 310-a. The first DCI message 315-a may be transmitted in a first CORESET of the first CORESET group (e.g., CORESETPoolIndex 0, and/or first TRP). In this regard, the first DCI message 315-a may schedule a first downlink data transmission 320-a and a second downlink data transmission 320-b, where both the first and second downlink data transmissions 320-a and 320-b are associated with the first CORESET group. For example, the first DCI message 315-a may schedule the first downlink data transmission 320-a in the first component carrier 310-a, and may schedule the second downlink data transmission 320-b in the second component carrier 310-b.

Similarly, the base station 105 may transmit a second DCI message 315-b to the UE 115 over the first component carrier 310-a. However, in some cases, the second DCI message 315-b may be transmitted over the second component carrier 310-b. The second DCI message 315-b may be transmitted in a second CORESET of the second CORESET group (e.g., CORESETPoolIndex 1, and/or second TRP). In this regard, the second DCI message 315-b may schedule a third downlink data transmission 320-c and a fourth downlink data transmission 320-d, where both the third and fourth downlink data transmissions 320-c and 320-d are associated with the second CORESET group. For example, the second DCI message 315-b may schedule the third downlink data transmission 320-c in the first component carrier 310-a, and may schedule the fourth downlink data transmission 320-d in the second component carrier 310-b.

In some aspects, the first DCI message 315-a, the second DCI message 315-b, or both, may indicate component carriers 310 to be used for respective downlink data transmissions 320 via values of a CIF within the respective DCI messages 315-a and 315-b. In this regard, the CIF values indicated in an RRC message may indicate a set of indices corresponding to component carrier 310 and CORESET group mapping pairs (e.g., {CC1, CORESETPoolIndex 0}, {CC2, CORESETPoolIndex 0}). Accordingly, the each value of the CIF indicated in the respective DCI messages 315-a and 315-b may indicate which mapping pair(s) of component carriers 310 and CORESET groups are to be used by the UE 115 when receiving the downlink data transmissions 320. In some cases, the CIF value within the respective DCI messages may indicate the component carrier 310 of each mapping pair, while the CORESET group may be indicated/determined to be the CORESET group on which each respective DCI message 315 was received.

For example, the first DCI message 315-a may indicate a value of a CIF including a first mapping pair including the first component carrier 310-a is associated with the first CORESET group (e.g., {CC1, CORESETPoolIndex 0}), and a second mapping pair including the second component carrier 310-b and the first CORESET group (e.g., {CC2, CORESETPoolIndex 0}). In this regard, the first mapping pair of the value of the CIF may indicate that the first component carrier 310-a is associated with the first CORESET group, and the second mapping pair of the value of the CIF may indicate that the second component carrier is associated with the second CORESET group. Similarly, by way of another example, the second DCI message 315-b may include a value of a CIF indicating a first mapping pair including the first component carrier 310-a and the second CORESET group (e.g., {CC1, CORESETPoolIndex 1}), and a second mapping pair including the second component carrier 310-b and the second CORESET group (e.g., {CC2, CORESETPoolIndex 1}). In this regard, the first mapping pair of the value of the CIF may indicate that the first component carrier 310-a is associated with the second CORESET group, and the second mapping pair of the value of the CIF may indicate that the second component carrier is associated with the second CORESET group.

Continuing with the same example, the first downlink data transmission 320-a may be transmitted/received according to the first mapping pair of the value of the CIF included in the first DCI message 315-a, and the second downlink data transmission 320-b may be transmitted/received according to the second mapping pair of the value of the CIF included in the first DCI message 315-a. Similarly, the third downlink data transmission 320-c may be transmitted/received according to the first mapping pair of the value of the CIF included in the second DCI message 315-b, and the fourth downlink transmission 320-d may be transmitted/received according to the second mapping pair of the value of the CIF included in the second DCI message 315-b.

In some aspects, the DCI messages 315 may be used to schedule downlink data transmissions across three or more component carriers 310. For example, as shown in the resource configuration 305-b, a base station 105 may transmit a first DCI message 315-c in a CORESET of a first CORESET group via a first component carrier 310-c, and a second DCI message 315-d in a CORESET of a second CORESET group via the first component carrier 310-c. In this example, the first DCI message 315-c may schedule a first downlink data transmission 320-e in the first component carrier 310-c, and a second downlink data transmission 320-f in a second component carrier 310-d. Additionally, or alternatively, the second DCI message 315-d may schedule a third downlink data transmission 320-g in the first component carrier 310-c, and a fourth downlink data transmission 320-h in a third component carrier 310-e.

As noted previously herein, the DCI messages 315 may be transmitted via different component carriers 310. For example, as shown in the resource configuration 305-c, a base station 105 may transmit a first DCI message 315-e in a CORESET of a first CORESET group via a first component carrier 310-f, and a second DCI message 315-f in a CORESET of a second CORESET group via a second component carrier 310-g. In this example, the first DCI message 315-e may schedule a first downlink data transmission 320-i in the first component carrier 310-f, and a second downlink data transmission 320-j in a third component carrier 310-h. Additionally, or alternatively, the second DCI message 315-f may schedule a third downlink data transmission 320-k in the first component carrier 310-f, and a fourth downlink data transmission 320-l in the second component carrier 310-g.

In some aspects, any of the DCI messages 315 illustrated in FIG. 3 may indicate associations (e.g., indexes) between the respective CORESET groups and component carriers 310 via values of CIF (e.g., mapping pairs) indicated in the DCI messages 315. Moreover, the DCI messages 315 may be received via any component carrier 310, and may be used to schedule downlink data transmissions in the same or different component carrier 310 on which the respective DCI message 315 was received.

The resource configurations 305-a, 305-b, and 305-c described herein may enable multiple downlink data transmissions 320 associated with given CORESET groups to be scheduled across multiple component carriers 310 via one or more DCI messages 315. In particular, a DCI message 315 may be configured to schedule multiple downlink data transmissions 320 associated with a single CORESET group (e.g., CORESETPoolIndex 0 or CORESETPoolIndex 1) across multiple component carriers 310. By enabling the scheduling of multiple downlink data transmissions 320 associated with a CORESET group with a single DCI message 315, control signaling overhead within a wireless communications system (e.g., wireless communications system 100 or 200) may be reduced, and flexibility of scheduling downlink data transmissions 320 may be improved.

Figure 4:
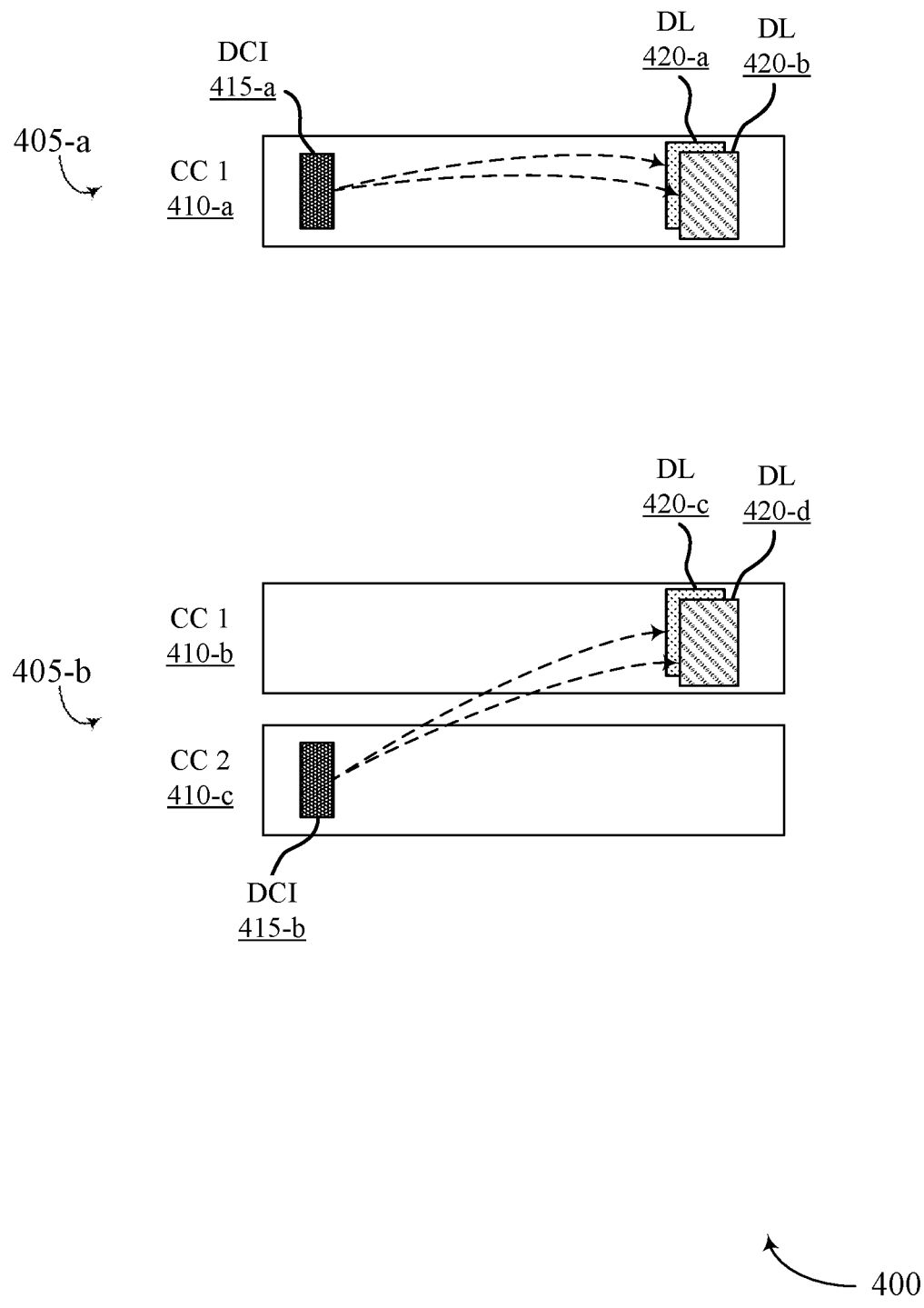
FIG. 4 illustrates an example of a resource allocation scheme that supports techniques for multiple component carrier scheduling in accordance with aspects of the present disclosure.

FIG. 4 illustrates an example of a resource allocation scheme 400 that supports techniques for multiple component carrier scheduling in accordance with aspects of the present disclosure. In some examples, resource allocation scheme 400 may implement, or be implemented by, aspects of wireless communications system 100 or 200. In some aspects, the resource allocation scheme 400 in FIG. 4 illustrates a first resource configuration 405-a and a second resource configuration 305-b.

In some cases, as noted previously herein, DCI messages 415 (e.g., DCI messages 220-a and 220-b illustrated in FIG. 2) may schedule two separate downlink data transmissions 420 (e.g., downlink data transmissions 225 illustrated in FIG. 2) in the same component carrier 410 (e.g., component carriers 210-a and 210-b illustrated in FIG. 2), where each of the downlink data transmissions 420 are associated with different CORESET groups (e.g., different TRPs).

For example, referring to resource configuration 405-a illustrated in FIG. 4, a base station 105 may transmit a DCI message 415-a to a UE 115 over a first component carrier 410-a. The DCI message 415-a may be transmitted/received in a CORESET of a first CORESET group (e.g., CORESETPoolIndex 0 and/or first TRP), a CORESET of a second CORESET group (e.g., CORESETPoolIndex 1 and/or second TRP), or both. In this regard, the DCI message 415-a may be associated with both the first CORESET group and the second CORESET group. In some aspects, the DCI message 415-a may schedule a first downlink data transmission 420-a and a second downlink data transmission 420-b in the first component carrier 410-a. In this example, the first downlink data transmission 420-a may be associated with the first CORESET group, and the second downlink data transmission 420-b may be associated with the second CORESET group.

In some aspects, a CIF value may indicate that both the first CORESET group and the second CORESET group are associated with the same component carrier 410 using a single mapping pair. For example, in some cases, the DCI message 415-a may include a value of a CIF indicating a mapping pair including the first component carrier 410-a and a third CORESET group (e.g., CORESETPoolIndex 2) (e.g., CIF={CC1, CORESETPoolIndex 2}). In this example, the indication of the third CORESET group within the mapping pair may indicate that both the first CORESET group and the second CORESET group are associated with the first component carrier 410-a.

The resource configurations 405-a and 405-b described herein may enable multiple downlink data transmissions 420 associated with multiple CORESET groups to be scheduled within a single component carriers 410 via a single DCI message 415. In particular, a DCI message 415 may be configured to schedule multiple downlink data transmissions 420 associated with multiple CORESET group (e.g., CORESETPoolIndex 0 or CORESETPoolIndex 1) within a single component carrier 410. By enabling the scheduling of multiple downlink data transmissions 420 associated with multiple CORESET groups with a single DCI message 415, control signaling overhead within a wireless communications system (e.g., wireless communications system 100 or 200) may be reduced, and flexibility of scheduling downlink data transmissions 420 may be improved.

Figure 5:
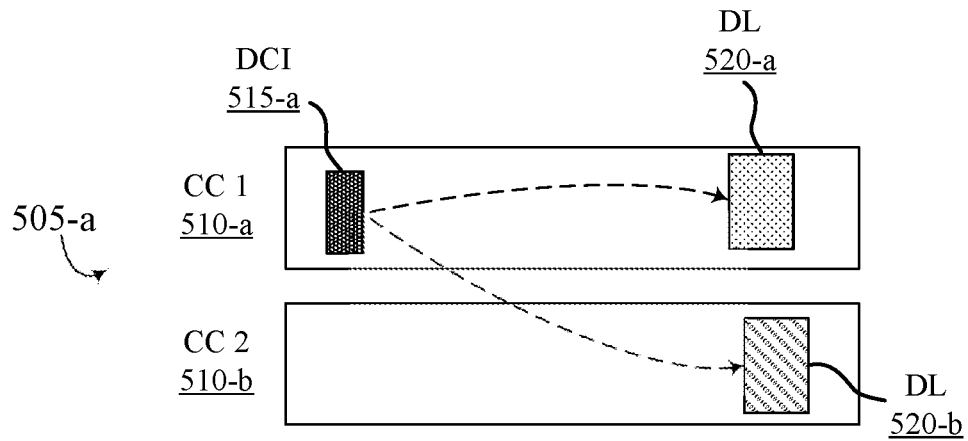
FIG. 5 illustrates an example of a resource allocation scheme that supports techniques for multiple component carrier scheduling in accordance with aspects of the present disclosure.
Figure 5:
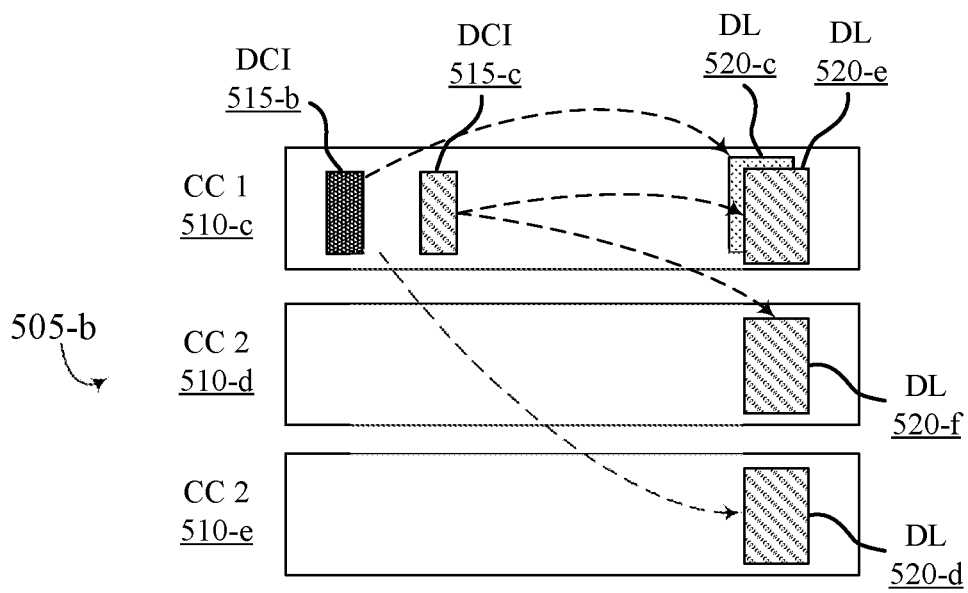

FIG. 5 illustrates an example of a resource allocation scheme 500 that supports techniques for multiple component carrier scheduling in accordance with aspects of the present disclosure. In some examples, resource allocation scheme 500 may implement, or be implemented by, aspects of wireless communications system 100 or 200. In some aspects, the resource allocation scheme 500 in FIG. 5 illustrates a first resource configuration 505-a and a second resource configuration 505-b.

In some cases, as noted previously herein, DCI messages 515 (e.g., DCI messages 220-a and 220-b illustrated in FIG. 2) may schedule two separate downlink data transmissions 520 (e.g., downlink data transmissions 225 illustrated in FIG. 2) in different component carriers 510 (e.g., component carriers 210-a and 210-b illustrated in FIG. 2), where each of the downlink data transmissions 520 are associated with different CORESET groups (e.g., different TRPs).

For example, referring to resource configuration 505-a illustrated in FIG. 5, a base station 105 may transmit a DCI message 515-a to a UE 115 over a first component carrier 510-a. The DCI message 515-a may be transmitted/received in a CORESET of a first CORESET group (e.g., CORESETPoolIndex 0 and/or first TRP), a CORESET of a second CORESET group (e.g., CORESETPoolIndex 1 and/or second TRP), or both. In this regard, the DCI message 515-a may be associated with both the first CORESET group and the second CORESET group. In some aspects, the DCI message 515-a may schedule a first downlink data transmission 520-a in the first component carrier 510-a, and a second downlink data transmission 520-b in a second component carrier 510-b. In this example, the first downlink data transmission 520-a may be associated with the first CORESET group, and the second downlink data transmission 520-b may be associated with the second CORESET group.

By way of another example, referring to resource configuration 505-b illustrated in FIG. 5, a base station 105 may transmit a first DCI message 515-b to a UE 115 over a first component carrier 510-c. Additionally, or alternatively, the base station 105 may transmit a second DCI message 515-c to the UE 115 over the first component carrier 510-c. In this example, the first DCI message 515-b may be transmitted/received in a CORESET of a first CORESET group (e.g., CORESETPoolIndex 0 and/or first TRP), a CORESET of a second CORESET group (e.g., CORESETPoolIndex 1 and/or second TRP), or both. In this regard, the first DCI message 515-b may be associated with both the first CORESET group and the second CORESET group. In some aspects, the first DCI message 515-b may schedule a first downlink data transmission 520-c in the first component carrier 510-c and a second downlink data transmission 520-d in a third component carrier 510-e. In this example, the first downlink data transmission 520-c may be associated with the first CORESET group, and the second downlink data transmission 520-d may be associated with the second CORESET group. Continuing with reference to resource configuration 505-b, the second DCI message 515-c may schedule a third downlink data transmission 520-e in the first component carrier 510-c and a fourth downlink data transmission 520-f in a second component carrier 510-d. In this example, both the third downlink data transmission 520-e and the fourth downlink data transmission 520-f may be associated with the second CORESET group.

As noted previously herein, the DCI messages 515-a, 515-b, and 515-c illustrated in FIG. 5 may indicate associations (e.g., indexes, mapping pairs) between the respective CORESET groups and component carriers 510 via values of CIF indicated in the respective DCI messages 515. For example, referring to resource configuration 505-a, the DCI message 515-a may indicate a value of a CIF which indicates a first mapping pair including the first component carrier 510-a and the first CORESET group (e.g., {CC1, CORESETPoolIndex 0}), and a second mapping pair including the second component carrier 510-b and the second CORESET group (e.g., {CC2, CORESETPoolIndex 0}). In this regard, the first downlink data transmission 520-a may be transmitted/received according to the first mapping pair of the CIF indicated in the DCI message 515-a, and the second downlink data transmission 520-b may be transmitted/received according to the second mapping pair of the CIF indicated in the DCI message 515-a.

The resource configurations 505-a and 505-b described herein may enable multiple downlink data transmissions 520 associated with multiple CORESET groups to be scheduled across multiple component carriers 510 via a single DCI message 515. In particular, a DCI message 515 may be configured to schedule multiple downlink data transmissions 420 associated with multiple CORESET groups (e.g., CORESETPoolIndex 0 or CORESETPoolIndex 1) across multiple component carriers 510. By enabling the scheduling of multiple downlink data transmissions 520 associated with multiple CORESET groups with a single DCI message 515, control signaling overhead within a wireless communications system (e.g., wireless communications system 100 or 200) may be reduced, and flexibility of scheduling downlink data transmissions 520 may be improved.

Figure 6:
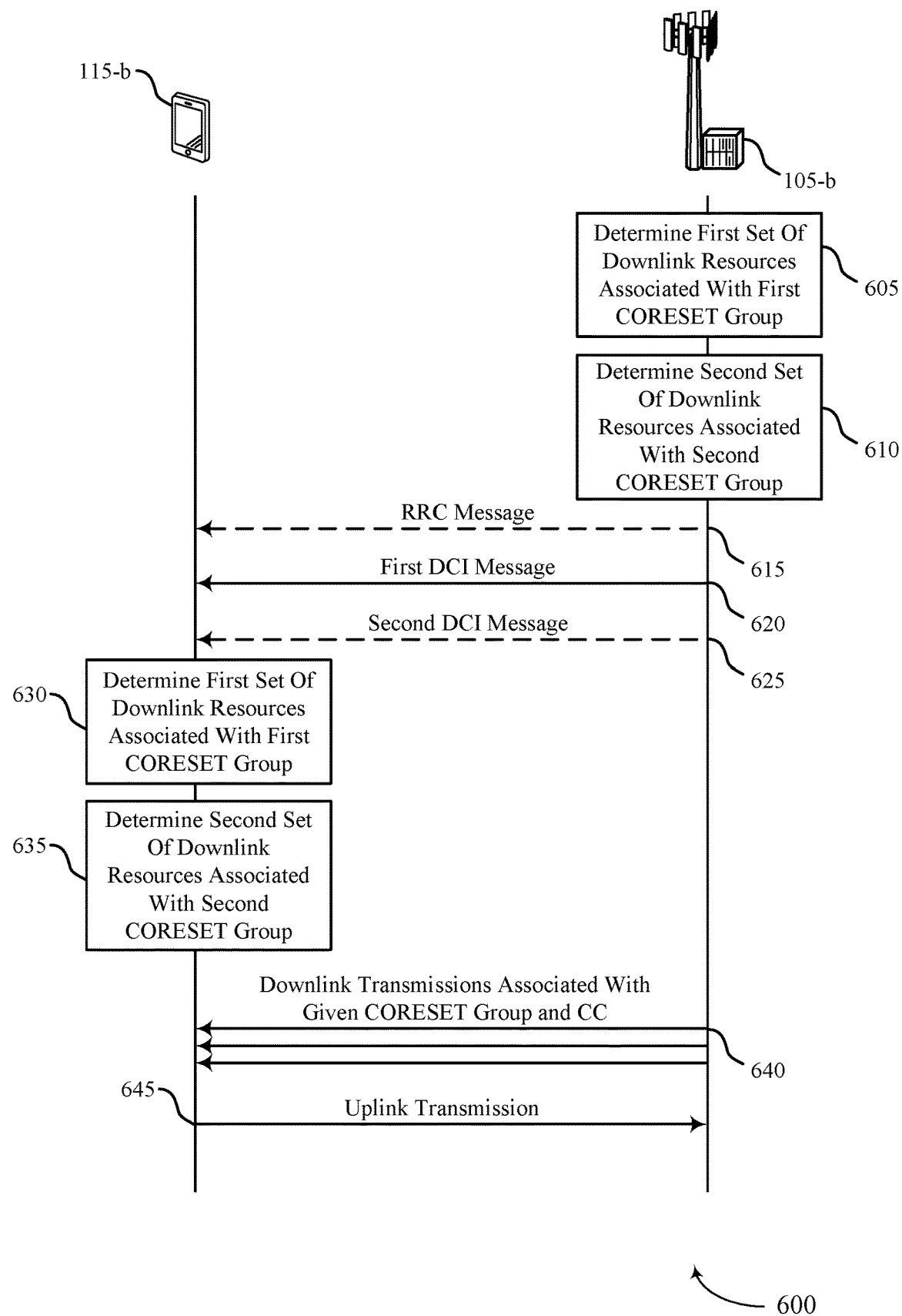
FIG. 6 illustrates an example of a process flow that supports techniques for multiple component carrier scheduling in accordance with aspects of the present disclosure.

FIG. 6 illustrates an example of a process flow 600 that supports techniques for multiple component carrier scheduling in accordance with aspects of the present disclosure. In some examples, process flow 600 may implement, or be implemented by, aspects of wireless communications system 100 or 200, resource allocation schemes 300, 400, or 500, or any combination thereof. The process flow 600 may illustrate receiving a DCI, determining sets of downlink resources, and receiving downlink data transmissions associated with CORESET groups, as described with reference to FIGS. 1-5, among other aspects.

In some aspects, process flow 600 may include a UE 115-b and a base station 105-b which may be examples of corresponding devices as described herein. The UE 115-b illustrated in FIG. 6 may be an example of the UE 115-a illustrated in FIG. 2. Similarly, the base station 105-b illustrated in FIG. 6 may be an example of the base station 105-a illustrated in FIG. 2.

In some aspects, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-b may determine a first set of downlink resources to be used by the UE 115-b. In some aspects, the first set of downlink resources may be associated with a first CORESET group (e.g., CORESETPoolIndex 0). The first set of downlink resources may include a set of time resources and a set of frequency resources to be used by the UE 115-b. The first set of downlink resources may be associated with one or more component carriers used in communications between the UE 115-*b* and the base station 105-*b*. In some aspects, the base station 105-*b* may additionally determine a first set of parameters associated with the first set of downlink resources, the first CORESET group, or both. The first set of parameters associated with the first set of downlink resources and/or first CORESET group may include a HARQ configuration, a PDSCH scrambling sequence, a CRS rate matching configuration, a TCI state, or any combination thereof.

In some aspects, the first set of downlink resources may include downlink resources in one or more component carriers. For example, the first set of downlink resources may include time and frequency resources within a single component carrier of the UE 115-*b*. By way of another example, the first set of downlink resources may include time and frequency resources in a first component carrier and a second component carrier. In this example, the first set of downlink resources may include a first subset of downlink resources associated with the first component carrier, and a second subset of downlink resources associated with the second component carrier.

At 610, the base station 105-*b* may determine a second set of downlink resources to be used by the UE 115-*b*. In some aspects, the second set of downlink resources may be associated with a second CORESET group (e.g., CORESETPoolIndex 1). The second set of downlink resources may include a set of time resources and a set of frequency resources to be used by the UE 115-*b*. Moreover, the second set of downlink resources may be different from the first set of downlink resources in the time domain, the frequency domain, or both. The second set of downlink resources may be associated with one or more component carriers used in communications between the UE 115-*b* and the base station 105-*b*. In some aspects, the base station 105-*b* may additionally determine a second set of parameters associated with the second set of downlink resources, the second CORESET group, or both. The second set of parameters associated with the second set of downlink resources and/or second CORESET group may include a HARQ configuration, a PDSCH scrambling sequence, a CRS rate matching configuration, a TCI state, or any combination thereof.

In some aspects, the second set of downlink resources may include downlink resources in one or more component carriers. For example, the second set of downlink resources may include time and frequency resources within a single component carrier of the UE 115-*b*. By way of another example, the second set of downlink resources may include time and frequency resources in a first component carrier and a second component carrier. In this example, the second set of downlink resources may include a first subset of downlink resources associated with the first component carrier, and a second subset of downlink resources associated with the second component carrier.

At 615, the UE 115-*b* may receive an RRC message from the base station 105-*b*. In some aspects, the base station 105-*b* may transmit the RRC message at 615 based on determining the first set of downlink resources at 605, determining the second set of downlink resources at 610, or both. In some aspects, the base station 105-*b* may transmit the RRC message via a physical downlink control channel (PDCCH).

In some aspects, the RRC message may indicate an association between one or more CORESET groups and one or more component carriers of the UE 115-*b*. For example, the RRC message may indicate that the first CORESET group (e.g., CORESETPoolIndex 0) is associated with a first component carrier and a second component carrier. In this example, the RRC message may further indicate that the second CORESET group (e.g., CORESETPoolIndex 1) is associated with the second component carrier and a third component carrier.

In additional or alternative aspects, the RRC message may indicate associations between CORESET groups and component carriers via one or more CIF values. In this regard, CIF values indicated in the RRC message may be associated with one or more component carriers, one or more CORESET groups, or both. In particular, each CIF value of the one or more CIF values included in the RRC message may include one or more mapping pairs, where each mapping pair indicates an association between a component carrier and one or more CORESET groups.

At 620, the UE 115-*b* may receive a DCI message from the base station 105-*b*. In some aspects, the DCI message may schedule downlink data transmissions at the UE 115-*b*. In some aspects, the base station 105-*b* may transmit the DCI message at 620 based on determining the first set of downlink resources at 605, determining the second set of downlink resources at 610, transmitting the RRC message at 615, or any combination thereof. Similarly, the UE 115-*b* may receive the DCI message at 620 based on receiving the RRC message at 615.

In some aspects, the DCI message received at 615 may be transmitted/received in a CORESET of the first CORESET group, the second CORESET group, or both. In this regard, the DCI message may be associated with the first CORESET group and/or the second CORESET group, and may indicate the respective set of resource(s). For example, the DCI message received at 615 may be transmitted/received in a CORESET of the first CORESET group, and may thereby include an indication of the first set of downlink resources associated with the first CORESET group. By way of another example, the DCI message received at 615 may be associated with the first CORESET group and the second CORESET group, and may thereby include an indications of both the first set of downlink resources and the second set of downlink resources.

In some cases, the DCI message received at 620 may indicate CORESET groups and/or component carriers to be used for communications at the UE 115-*b* via a value of a CIF. In particular, the DCI message may include a value of a CIF which includes one or more mapping pairs indicating associations between a component carrier and one or more CORESET groups. In this regard, the CIF values indicated in the RRC message received at 615 may indicate a set of indices corresponding to CORESET group and component carrier mapping pairs (e.g., {CC1, CORESETPoolIndex 0}, {CC2, CORESETPoolIndex 0}), and the value of the CIF indicated in the DCI message received at 620 may indicate an index (e.g., one or more mapping pairs) which corresponds to an index of the set of indices indicated in the RRC message. Accordingly, the value of the CIF indicated in the DCI message may indicate one or more mapping pairs which correspond to one or more mapping pairs indicated in a CIF within the RRC message.

At 625, the UE 115-*b* may receive a second DCI message from the base station 105-*b*. In some aspects, the second DCI message may schedule downlink data transmissions at the UE 115-*b*. In some aspects, the base station 105-*b* may transmit the second DCI message at 625 based on determining the first set of downlink resources at 605, determining the second set of downlink resources at 610, transmitting the RRC message at 615, transmitting the DCI message at 620, or any combination thereof. Similarly, the UE 115-*b* may receive the DCI message at 625 based on receiving the RRC message at 615, receiving the DCI message at 620, or both.

In some cases, the DCI messages received at 620 and 625 may be transmitted/received in a CORESET of the first CORESET group, a CORESET of the second CORESET group, or both. For example, the DCI message received at 620 may be received in a CORESET of the first CORESET group (e.g., CORESETPoolIndex 0), and the second DCI message received at 625 may be received in a CORESET of the second CORESET group (e.g., CORESETPoolIndex 1). In this example, the first DCI message received at 620 may include an indication of the first set of downlink resources associated with the first CORESET group, and the second DCI message received at 625 may include an indication of the second set of downlink resources associated with the second CORESET group.

By way of another example, the DCI message received at 620 may be associated with (e.g., transmitted/received in) the second CORESET group (e.g., CORESETPoolIndex 1), and the second DCI message received at 625 may be associated with (e.g., transmitted/received in) the first CORESET group (e.g., CORESETPoolIndex 0). In this example, the first DCI message received at 620 may include an indication of the second set of downlink resources associated with the second CORESET group, and the second DCI message received at 625 may include an indication of the first set of downlink resources associated with the first CORESET group.

In some cases, the DCI message received at 625 may indicate CORESET groups and/or component carriers to be used for communications at the UE 115-*b* via values of a CIF. The DCI message may include an indication of a value of a CIF which includes one or more mapping pairs, where each mapping pair indicates an association between a component carrier and one or more CORESET groups. In this regard, the CIF values indicated in the RRC message received at 615 may indicate a set of indices corresponding to CORESET group and component carrier mapping pairs (e.g., {CC1, CORESETPoolIndex 0}, {CC2, CORESETPoolIndex 0}), and the value of the CIF indicated in the DCI message received at 625 may indicate an index which corresponds to an index of the set of indices indicated in the RRC message. Accordingly, the value of the CIF indicated in the DCI message may indicate one or more mapping pairs which correspond to one or more mapping pairs indicated in the CIF values in the RRC message.

At 630, the UE 115-*b* may determine the first set of downlink resources associated with the first CORESET group. In some aspects, the UE 115-*b* may determine the first set of downlink resources based on receiving the RRC message at 615, receiving the first DCI message at 620, receiving the second DCI message at 625, or any combination thereof. For example, the UE 115-*b* may determine the first set of downlink resources at 630 based on an indication of the first set of downlink resources indicated in the first DCI message received at 620 and/or the second DCI message received at 625.

In some aspects, the UE 115-*b* may determine whether the first set of downlink resources is associated with one or more component carriers. For example, the UE 115-*b* may determine that the first set of downlink resources associated with the first CORESET group includes a first subset of downlink resources associated with (e.g., within) the first component carrier, and a second subset of downlink resources associated with (e.g., within) the second component carrier. By way of another example, the UE 115-*b* may determine that the first set of downlink resources is associated with a single component carrier (e.g., the first component carrier or the second component carrier). In some aspects, the UE 115-*b* may determine associations between the first set of downlink resources (e.g., the first CORESET group) and one or more component carriers based on the CIF values indicated in the RRC message received at 615, the one or more CIF values indicated in the DCI messages received at 620 and/or 625, or any combination thereof.

At 635, the UE 115-*b* may determine the second set of downlink resources associated with the second CORESET group. In some aspects, the UE 115-*b* may determine the second set of downlink resources based on receiving the RRC message at 615, receiving the first DCI message at 620, receiving the second DCI message at 625, or any combination thereof. For example, the UE 115-*b* may determine the second set of downlink resources at 635 based on an indication of the second set of downlink resources indicated in the first DCI message received at 620 and/or the second DCI message received at 625.

In some aspects, the UE 115-*b* may determine whether the second set of downlink resources is associated with one or more component carriers. For example, the UE 115-*b* may determine that the first set of downlink resources associated with the first CORESET group includes a first subset of downlink resources associated with (e.g., within) the first component carrier, and a second subset of downlink resources associated with (e.g., within) the second component carrier. By way of another example, the UE 115-*b* may determine that the second set of downlink resources is associated with a single component carrier (e.g., the first component carrier or the second component carrier). In some aspects, the UE 115-*b* may determine associations between the second set of downlink resources (e.g., the first CORESET group) and one or more component carriers based on the CIF values indicated in the RRC message received at 615, the one or more CIF values indicated in the DCI messages received at 620 and/or 625, or any combination thereof.

At 640, the UE 115-*b* may receive one or more downlink data transmissions from the base station 105-*b*. The UE 115-*b* may receive the one or more downlink data transmissions based on the RRC message received at 615, the DCI messages received at 620 and 625, determining the first and second sets of downlink resources at 630 and 635, monitoring the first and second sets of downlink resources at 640, or any combination thereof. In some aspects, the UE 115-*b* may communicate with the base station 105-*b* at 645 (e.g., receive the one or more downlink data transmissions) using the first set of parameters associated with the first CORESET group, the second set of parameters associated with the second CORESET group, or both.

The downlink data transmissions transmitted by the base station may be associated with the first CORESET group and/or the second CORESET group, and may be received across one or more component carriers. For example, the UE 115-*b* may receive one or more first downlink data transmissions on the first set of downlink resources associated with the first CORESET group, and may receive one or more second downlink data transmissions on the second set of downlink resources associated with the second CORESET group.

For instance, the first DCI message received at 620 may indicate that the first CORESET group is associated with the both first component carrier and the second component carrier, and the second DCI message received at 625 may indicate that the second CORESET group is associated with both the first component carrier and the second component carrier. In this example, the UE 115-*b* may receive four separate downlink data transmissions: a first downlink data transmission associated with the first CORESET group over the first component carrier, a second downlink data transmission associated with the first CORESET group over the second component carrier, a third downlink data transmission associated with the second CORESET group over the first component carrier, and a fourth downlink data transmission associated with the second CORESET group over the second component carrier.

By way of another example, the UE 115-*b* may receive a single DCI message at 615, where the DCI message indicates that the first CORESET group and the second CORESET group are associated with the first component carrier. In this example, the UE 115-*b* may receive a first downlink data transmission associated with the first CORESET group over the first component carrier, and a second downlink data transmission associated with the second CORESET group over the first component carrier. Conversely, in another example, the UE 115-*b* may receive a single DCI message at 615, where the DCI message indicates that the first CORESET group is associated with the first component carrier and the second CORESET group is associated with the second component carrier. In this example, the UE 115-*b* may receive a first downlink data transmission associated with the first CORESET group over the first component carrier, and a second downlink data transmission associated with the second CORESET group over the second component carrier.

At 650, the UE 115-*b* may transmit one or more uplink transmissions to the base station 105-*b*. The UE 115-*b* may transmit the one or more uplink transmissions based on the RRC message received at 615, the DCI messages received at 620 and 625, determining the first and second sets of downlink resources at 630 and 635, monitoring the first and second sets of downlink resources at 640, or any combination thereof. In some aspects, the UE 115-*b* may communicate with the base station 105-*b* at 645 (e.g., transmit the one or more downlink data transmissions) using the first set of parameters associated with the first CORESET group, the second set of parameters associated with the second CORESET group, or both. For example, the UE 115-*b* may transmit one or more feedback messages (e.g., uplink transmissions) at 650 based on a HARQ configuration associated with the first set of parameters of the first CORESET group, a HARQ configuration associated with the second set of parameters of the second CORESET group, or both.

Techniques described herein may enable multiple downlink data transmissions associated with given CORESET groups to be scheduled within or across multiple component carriers via one or more DCI messages. In particular, a DCI message may be configured to schedule multiple downlink data transmissions associated with one or more CORESET groups (e.g., CORESETPoolIndex 0, CORESETPoolIndex 1) within a single component carrier, across multiple component carriers, or both. By enabling scheduling multiple downlink data transmissions associated with CORESET groups with a single DCI message, control signaling overhead within a wireless communications system (e.g., wireless communications system 100 or 200) may be reduced, and flexibility of scheduling downlink data transmissions may be improved.

Figure 7:
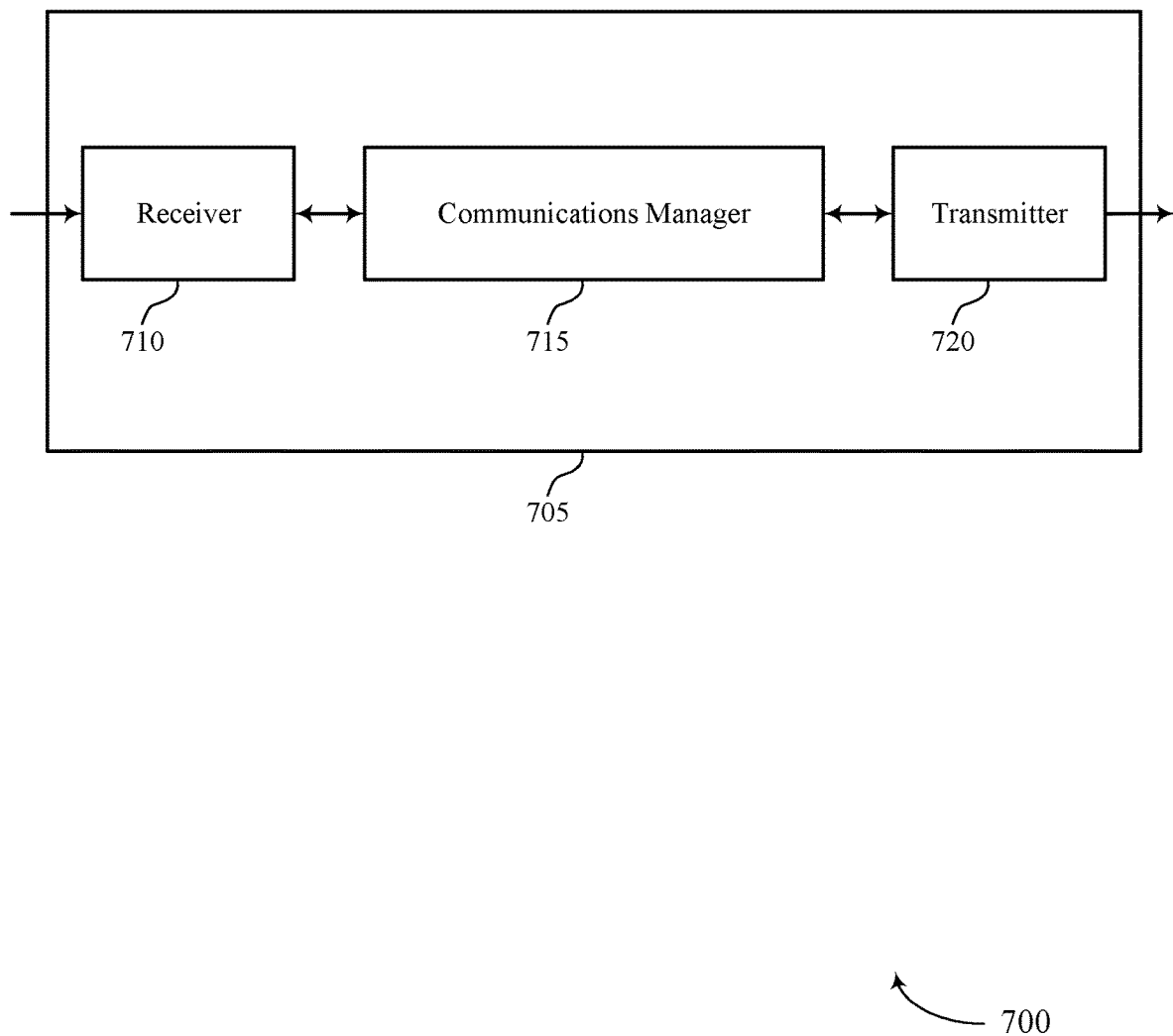
FIGS. 7 and 8 show block diagrams of devices that support techniques for multiple component carrier scheduling in accordance with aspects of the present disclosure.

FIG. 7 shows a block diagram 700 of a device 705 that supports techniques for multiple component carrier scheduling in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for multiple component carrier scheduling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station and on a first component carrier of a set of component carriers, one or more DCI messages scheduling downlink data transmissions at the UE, where at least one DCI message schedules two or more downlink data transmissions, determine, based on the one or more DCI messages, a first set of downlink resources and a second set of downlink resources, the first set of downlink resources being associated with a first CORESET group and the second set of downlink resources being associated with a second CORESET group, receive one or more first downlink data transmissions on the first set of downlink resources and one or more second downlink data transmissions on the second set of downlink resources, and communicate using a first set of parameters associated with the first CORESET group and a second set of parameters associated with the second CORESET group based on receiving the one or more first downlink data transmissions and the one or more second downlink data transmissions. The communications manager 715 may be an example of aspects of the communications manager 1010 described herein.

The actions performed by the communications manager 715 as described herein may be implemented to realize one or more potential advantages. For example, scheduling multiple downlink data transmissions associated with one or more CORESET groups across one or more component carriers may reduce control signaling within a wireless communications system, thereby alleviating network overhead. Moreover, by reducing the quantity of DCI messages used to schedule downlink data transmissions, power consumption of the UE 115 may be reduced.

Based on scheduling multiple downlink data transmissions associated with one or more CORESET groups via a single DCI, a processor of the UE 115 (e.g., a processor controlling the receiver 710, the communications manager 715, the transmitter 720, etc.) may reduce processing resources used for downlink communications. For example, by scheduling multiple downlink data transmissions across component carriers with a single DCI message, the UE 115 may reduce a number of times the processor ramps up processing power and turns on processing units to handle downlink reception of DCI messages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
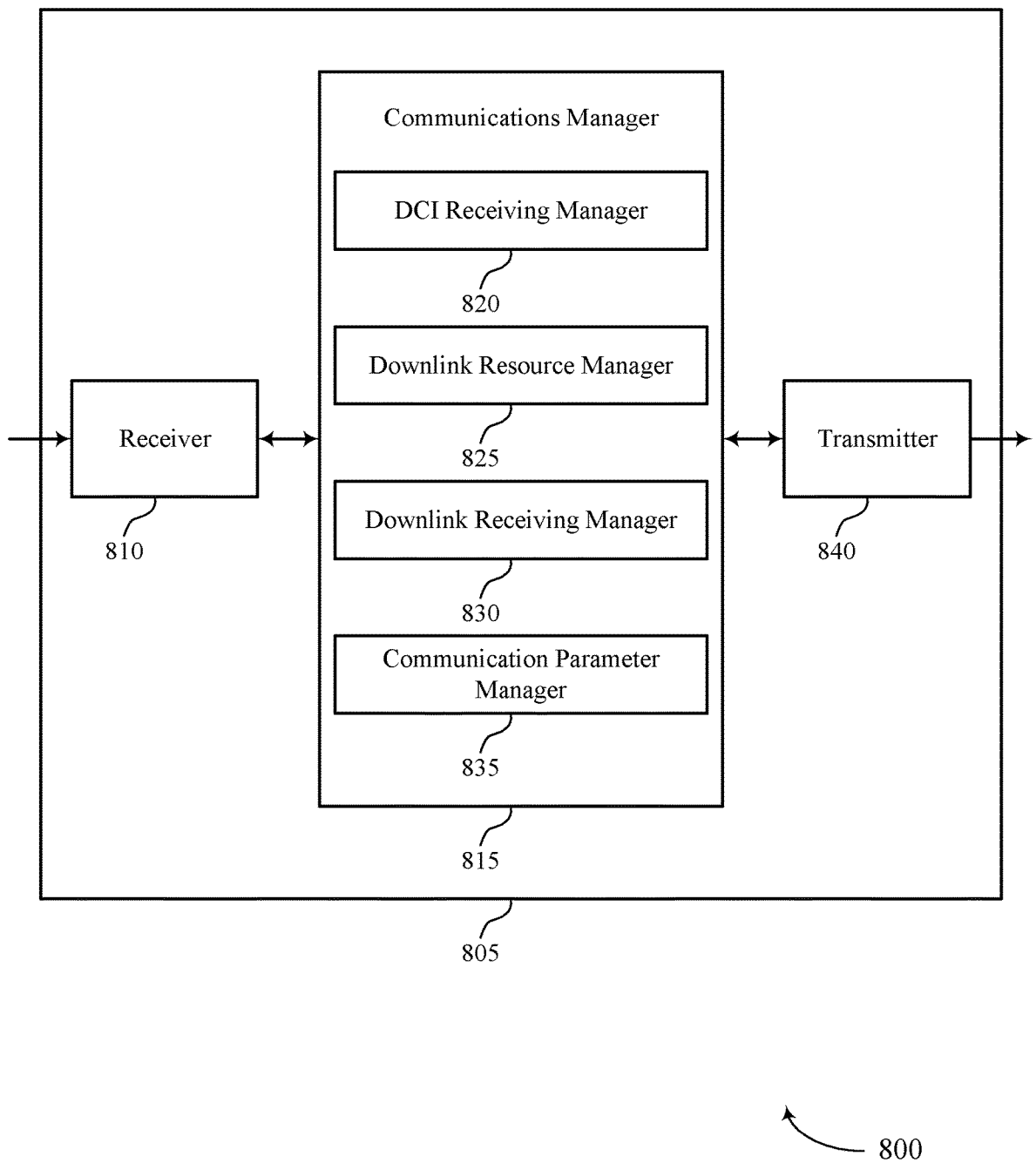

FIG. 8 shows a block diagram 800 of a device 805 that supports techniques for multiple component carrier scheduling in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for multiple component carrier scheduling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a DCI receiving manager 820, a downlink resource manager 825, a downlink receiving manager 830, and a communication parameter manager 835. The communications manager 815 may be an example of aspects of the communications manager 1010 described herein.

The DCI receiving manager 820 may receive, from a base station and on a first component carrier of a set of component carriers, one or more DCI messages scheduling downlink data transmissions at the UE, where at least one DCI message schedules two or more downlink data transmissions.

The downlink resource manager 825 may determine, based on the one or more DCI messages, a first set of downlink resources and a second set of downlink resources, the first set of downlink resources being associated with a first CORESET group and the second set of downlink resources being associated with a second CORESET group.

The downlink receiving manager 830 may receive one or more first downlink data transmissions on the first set of downlink resources and one or more second downlink data transmissions on the second set of downlink resources.

The communication parameter manager 835 may communicate using a first set of parameters associated with the first CORESET group and a second set of parameters associated with the second CORESET group based on receiving the one or more first downlink data transmissions and the one or more second downlink data transmissions.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
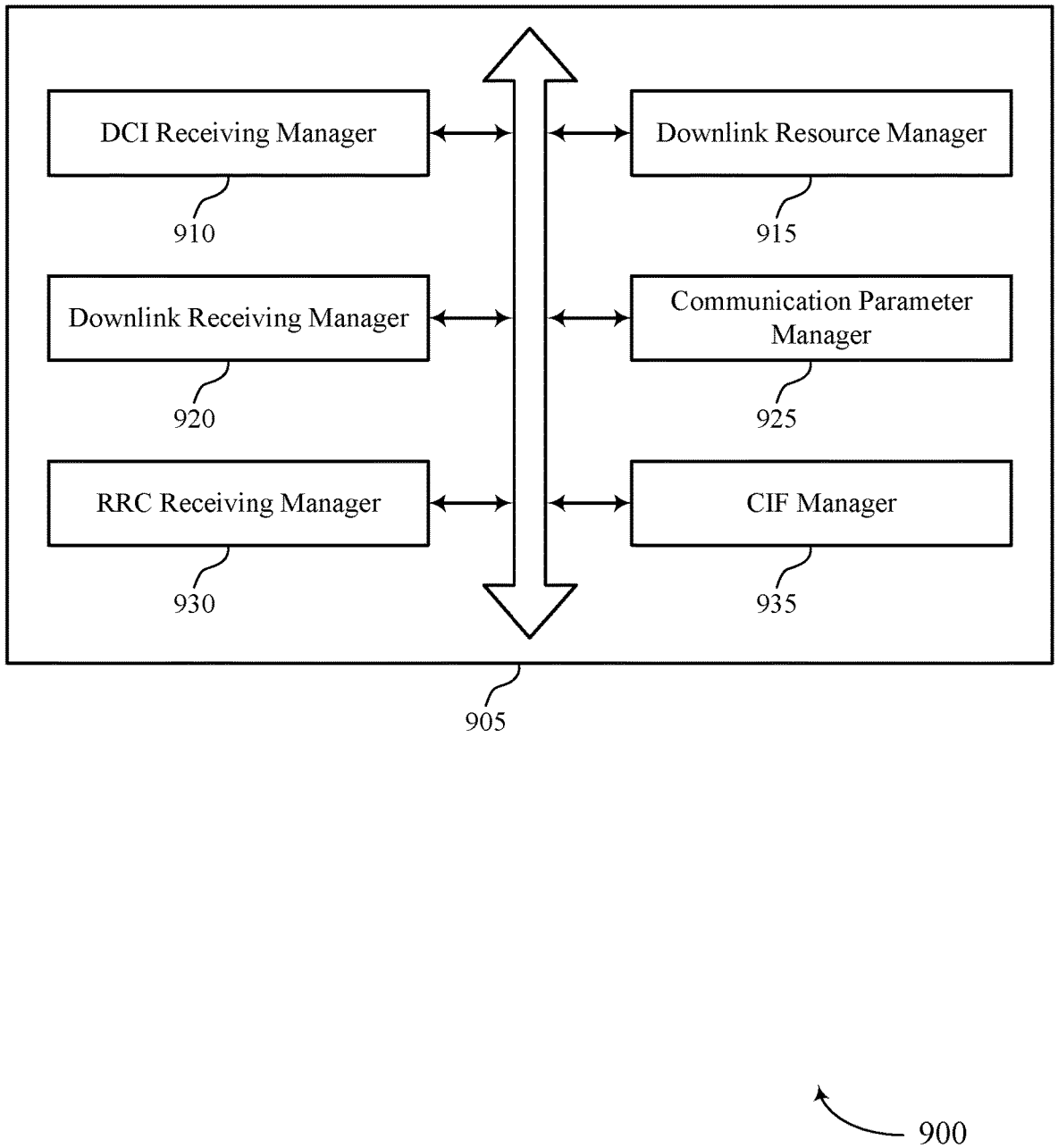
FIG. 9 shows a block diagram of a communications manager that supports techniques for multiple component carrier scheduling in accordance with aspects of the present disclosure.

FIG. 9 shows a block diagram 900 of a communications manager 905 that supports techniques for multiple component carrier scheduling in accordance with aspects of the present disclosure. The communications manager 905 may be an example of aspects of a communications manager 715, a communications manager 815, or a communications manager 1010 described herein. The communications manager 905 may include a DCI receiving manager 910, a downlink resource manager 915, a downlink receiving manager 920, a communication parameter manager 925, a RRC receiving manager 930, and a CIF manager 935. Each of these modules may communicate, directly or indirectly, with one another (e.g., via one or more buses).

The DCI receiving manager 910 may receive, from a base station and on a first component carrier of a set of component carriers, one or more DCI messages scheduling downlink data transmissions at the UE, where at least one DCI message schedules two or more downlink data transmissions. In some examples, the DCI receiving manager 910 may receive, from the base station, a first DCI message in a first CORESET of the first CORESET group, the first DCI message including an indication of the first set of downlink resources. In some examples, the DCI receiving manager 910 may receive, from the base station, a second DCI message in a second CORESET of the second CORESET group, the second DCI message including an indication of the second set of downlink resources. In some examples, the DCI receiving manager 910 may receive a single DCI message that includes an indication of the first CORESET group and the second CORESET group.

The downlink resource manager 915 may determine, based on the one or more DCI messages, a first set of downlink resources and a second set of downlink resources, the first set of downlink resources being associated with a first CORESET group and the second set of downlink resources being associated with a second CORESET group. In some examples, the downlink resource manager 915 may determine that the first set of downlink resources associated with the first CORESET group includes first and second subsets of the first set of downlink resources within different component carriers. In some examples, the downlink resource manager 915 may determine that the second set of downlink resources associated with the second CORESET group includes first and second subsets of the second set of downlink resources within different component carriers.

The downlink receiving manager 920 may receive one or more first downlink data transmissions on the first set of downlink resources and one or more second downlink data transmissions on the second set of downlink resources. In some examples, the downlink receiving manager 920 may receive the one or more first downlink data transmissions and the one or more second downlink data transmissions over the first component carrier in accordance with the value of the carrier indicator field in the single DCI message.

In some examples, the downlink receiving manager 920 may receive the one or more first downlink data transmissions on the first set of downlink resources associated with the first CORESET group over a second component carrier different from the first component carrier in accordance with a first mapping pair of the value of the carrier indicator field in the single DCI message, where the first mapping pair includes the second component carrier and the first CORESET group. In some examples, the downlink receiving manager 920 may receive the one or more second downlink data transmissions on the second set of downlink resources associated with the second CORESET group over the second component carrier in accordance with a second mapping pair of the value of the carrier indicator field in the single DCI message, where the second mapping pair includes the second component carrier and the second CORESET group.

In some examples, the downlink receiving manager 920 may receive the one or more first downlink data transmissions on the first set of downlink resources associated with the first CORESET group over the first component carrier in accordance with a first mapping pair of the value of the carrier indicator field in the single DCI message; where the first mapping pair includes the first component carrier and the first CORESET group. In some examples, the downlink receiving manager 920 may receive the one or more second downlink data transmissions on the second set of downlink resources associated with the second CORESET group over a second component carrier different from the first component carrier in accordance with a second mapping pair of the value of the carrier indicator field in the single DCI message, where the second mapping pair includes the second component carrier and the second CORESET group.

The communication parameter manager 925 may communicate using a first set of parameters associated with the first CORESET group and a second set of parameters associated with the second CORESET group based on receiving the one or more first downlink data transmissions and the one or more second downlink data transmissions. In some cases, the sets of parameters include a HARQ configuration, a PDSCH scrambling sequence, a CRS rate matching configuration, a TCI state, or any combination thereof.

The RRC receiving manager 930 may receive, from the base station, a DCI message indicating a set of carrier indicator field values, with each carrier indicator field value being associated with a mapping pair including a component carrier of the set of component carriers and at least one of the first CORESET group or the second CORESET group, where receiving the one or more first downlink data transmissions and the one or more second downlink data transmissions is based on a value of a carrier indicator field in the single DCI message and the set of carrier indicator field values in the DCI message.

In some examples, the RRC receiving manager 930 may receive, from the base station, a DCI message indicating a set of carrier indicator field values, with each carrier indicator field value being associated with two mapping pairs of component carrier and CORESET group values, each mapping pair including a different CORESET group from either the first CORESET group or the second CORESET group, and each mapping pair including a different component carrier from the set of component carriers, where receiving the one or more first downlink data transmissions and the one or more second downlink data transmissions is based on a value of a carrier indicator field in the single DCI message and the set of carrier indicator field values in the DCI message.

The CIF manager 935 may determine the first set of parameters associated with the first CORESET group and the second set of parameters associated with the second CORESET group.

In some cases, the value of the carrier indicator field in the single DCI message is associated with both the first CORESET group and the second CORESET group.

Figure 10:
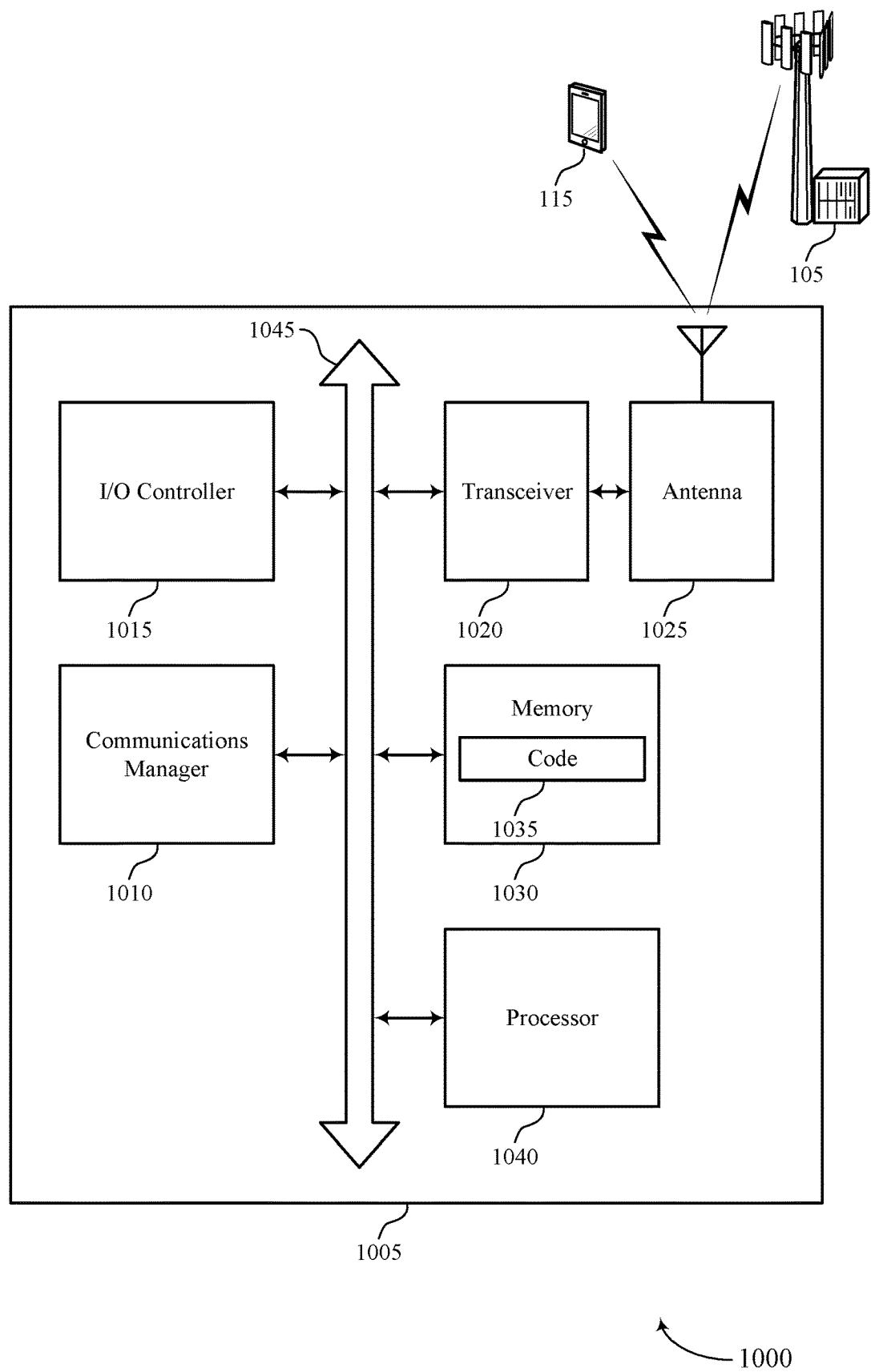
FIG. 10 shows a diagram of a system including a device that supports techniques for multiple component carrier scheduling in accordance with aspects of the present disclosure.

FIG. 10 shows a diagram of a system 1000 including a device 1005 that supports techniques for multiple component carrier scheduling in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station and on a first component carrier of a set of component carriers, one or more DCI messages scheduling downlink data transmissions at the UE, where at least one DCI message schedules two or more downlink data transmissions, determine, based on the one or more DCI messages, a first set of downlink resources and a second set of downlink resources, the first set of downlink resources being associated with a first CORESET group and the second set of downlink resources being associated with a second CORESET group, receive one or more first downlink data transmissions on the first set of downlink resources and one or more second downlink data transmissions on the second set of downlink resources, and communicate using a first set of parameters associated with the first CORESET group and a second set of parameters associated with the second CORESET group based on receiving the one or more first downlink data transmissions and the one or more second downlink data transmissions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for multiple component carrier scheduling).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
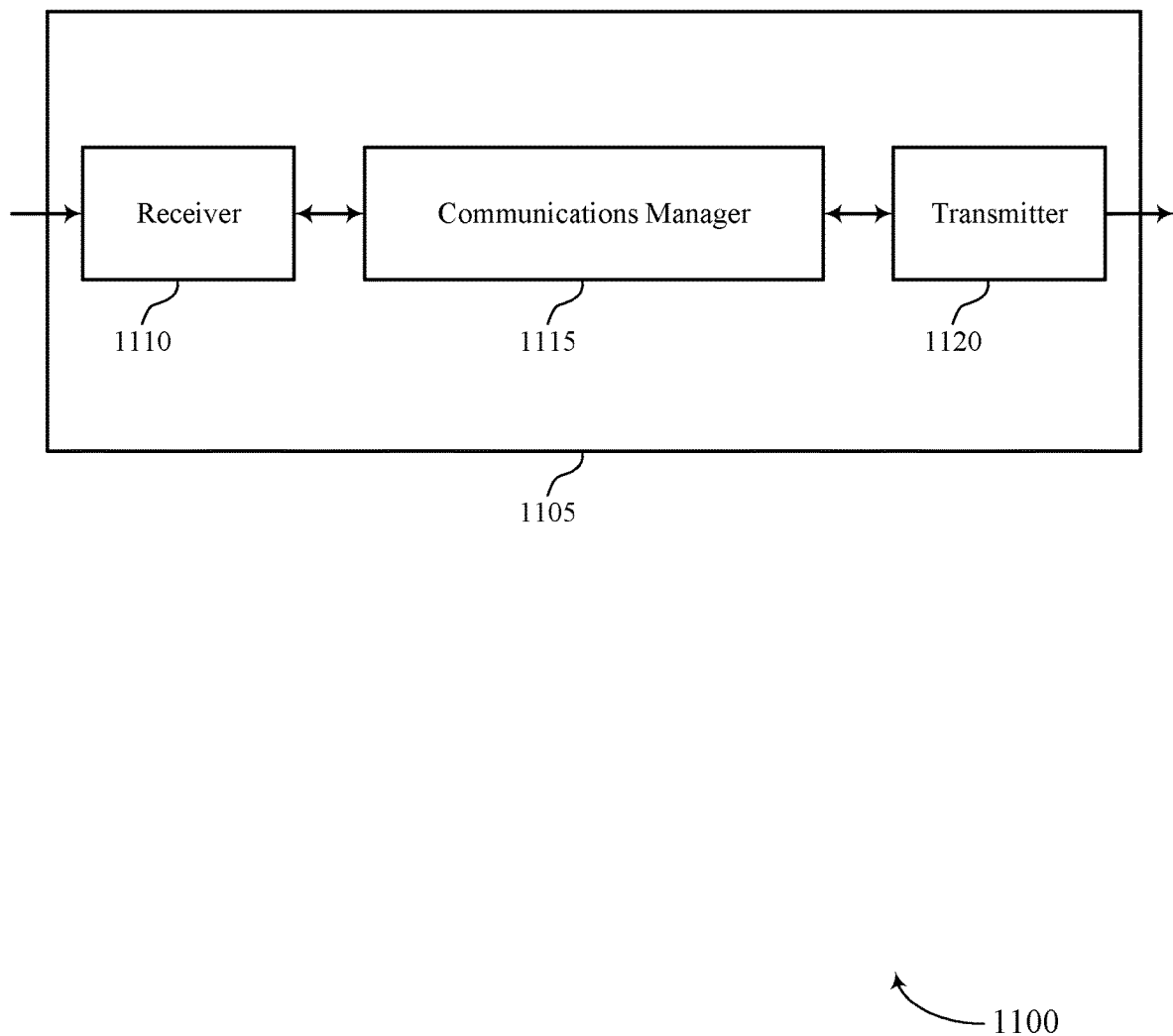
FIGS. 11 and 12 show block diagrams of devices that support techniques for multiple component carrier scheduling in accordance with aspects of the present disclosure.

FIG. 11 shows a block diagram 1100 of a device 1105 that supports techniques for multiple component carrier scheduling in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for multiple component carrier scheduling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmit, to the UE and on a first component carrier of the set of component carriers, one or more DCI messages scheduling downlink data transmissions at the UE, where at least one DCI schedules two or more downlink data transmissions, transmit, to the UE, one or more first downlink data transmissions on the first set of downlink resources and one or more second downlink data transmissions on the second set of downlink resources based on the one or more DCI messages, and communicate, with the UE, using a first set of parameters associated with the first CORESET group and a second set of parameters associated with the second CORESET group. The communications manager 1115 may be an example of aspects of the communications manager 1410 described herein.

The actions performed by the communications manager 1115 as described herein may be implemented to realize one or more potential advantages. For example, scheduling multiple downlink data transmissions associated with one or more CORESET groups across one or more component carriers may reduce control signaling within a wireless communications system, thereby alleviating network overhead. Moreover, by reducing the quantity of DCI messages used to schedule downlink data transmissions, power consumption of the base station 105 may be reduced.

Based on scheduling multiple downlink data transmissions associated with one or more CORESET groups via a single DCI, a processor of the base station 105 (e.g., a processor controlling the receiver 1110, the communications manager 1115, the transmitter 1120, etc.) may reduce processing resources used for downlink communications. For example, by scheduling multiple downlink data transmissions across component carriers with a single DCI message, the base station 105 may reduce a number of times the processor ramps up processing power and turns on processing units to handle transmission of DCI messages.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
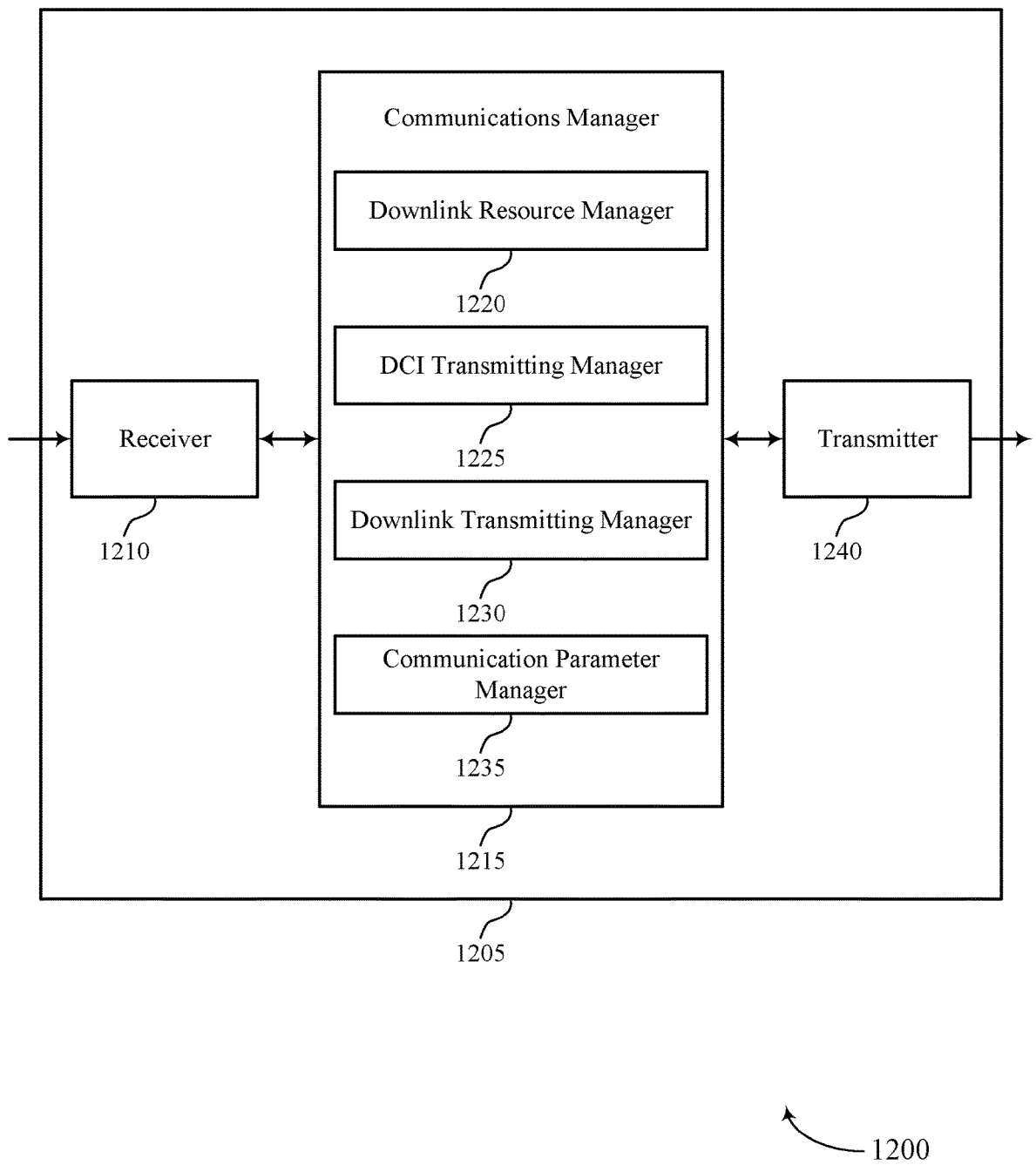

FIG. 12 shows a block diagram 1200 of a device 1205 that supports techniques for multiple component carrier scheduling in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for multiple component carrier scheduling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a downlink resource manager 1220, a DCI transmitting manager 1225, a downlink transmitting manager 1230, and a communication parameter manager 1235. The communications manager 1215 may be an example of aspects of the communications manager 1410 described herein.

The downlink resource manager 1220 may determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE.

The DCI transmitting manager 1225 may transmit, to the UE and on a first component carrier of the set of component carriers, one or more DCI messages scheduling downlink data transmissions at the UE, where at least one DCI schedules two or more downlink data transmissions.

The downlink transmitting manager 1230 may transmit, to the UE, one or more first downlink data transmissions on the first set of downlink resources and one or more second downlink data transmissions on the second set of downlink resources based on the one or more DCI messages.

The communication parameter manager 1235 may communicate, with the UE, using a first set of parameters associated with the first CORESET group and a second set of parameters associated with the second CORESET group.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
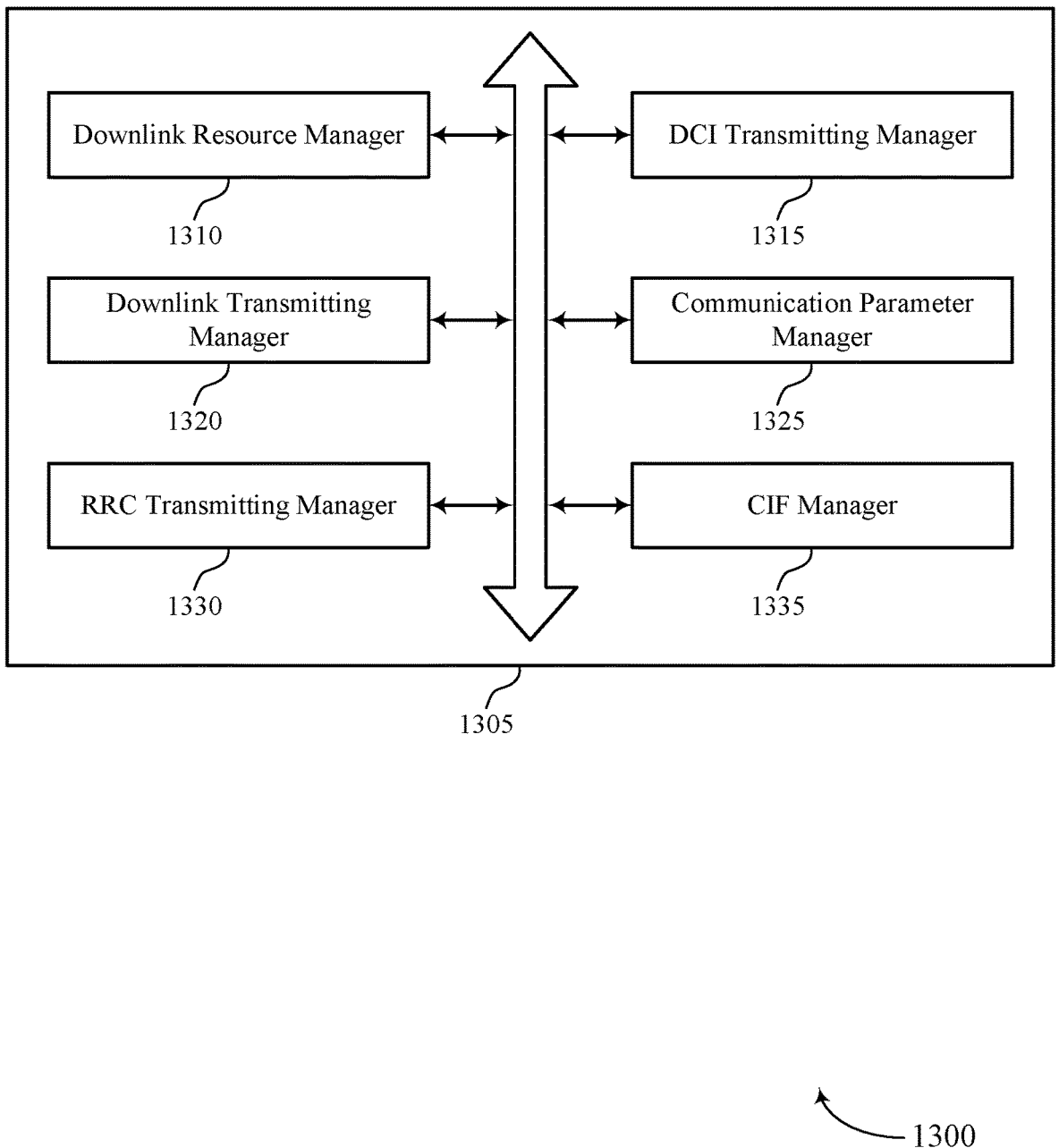
FIG. 13 shows a block diagram of a communications manager that supports techniques for multiple component carrier scheduling in accordance with aspects of the present disclosure.

FIG. 13 shows a block diagram 1300 of a communications manager 1305 that supports techniques for multiple component carrier scheduling in accordance with aspects of the present disclosure. The communications manager 1305 may be an example of aspects of a communications manager 1115, a communications manager 1215, or a communications manager 1410 described herein. The communications manager 1305 may include a downlink resource manager 1310, a DCI transmitting manager 1315, a downlink transmitting manager 1320, a communication parameter manager 1325, a RRC transmitting manager 1330, and a CIF manager 1335. Each of these modules may communicate, directly or indirectly, with one another (e.g., via one or more buses).

The downlink resource manager 1310 may determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE. In some examples, the downlink resource manager 1310 may determine that the first set of downlink resources associated with the first CORESET group includes first and second subsets of the first set of downlink resources within different component carriers. In some examples, the downlink resource manager 1310 may determine that the second set of downlink resources associated with the second CORESET group includes first and second subsets of the second set of downlink resources within different component carriers.

The DCI transmitting manager 1315 may transmit, to the UE and on a first component carrier of the set of component carriers, one or more DCI messages scheduling downlink data transmissions at the UE, where at least one DCI schedules two or more downlink data transmissions. In some examples, the DCI transmitting manager 1315 may transmit, to the UE, a first DCI message in a first CORESET of the first CORESET group, the first DCI message including an indication of the first set of downlink resources. In some examples, the DCI transmitting manager 1315 may transmit, to the UE, a second DCI message in a second CORESET of the second CORESET group, the second DCI message including an indication of the second set of downlink resources. In some examples, the DCI transmitting manager 1315 may transmit a single DCI message that includes an indication of the first CORESET group and the second CORESET group.

The downlink transmitting manager 1320 may transmit, to the UE, one or more first downlink data transmissions on the first set of downlink resources and one or more second downlink data transmissions on the second set of downlink resources based on the one or more DCI messages. In some examples, the downlink transmitting manager 1320 may transmit the one or more first downlink data transmissions and the one or more second downlink data transmissions over the first component carrier in accordance with the value of the carrier indicator field in the single DCI message.

In some examples, the downlink transmitting manager 1320 may transmit the one or more first downlink data transmissions on the first set of downlink resources associated with the first CORESET group over a second component carrier different from the first component carrier in accordance with a first mapping pair of the value of the carrier indicator field in the single DCI message, where the first mapping pair includes the second component carrier and the first CORESET group. In some examples, the downlink transmitting manager 1320 may transmit the one or more second downlink data transmissions on the second set of downlink resources associated with the second CORESET group over the second component carrier, in accordance with a second mapping pair of the value of the carrier indicator field in the single DCI message, where the second mapping pair includes the second component carrier and the second CORESET group.

In some examples, the downlink transmitting manager 1320 may transmit the one or more first downlink data transmissions on the first set of downlink resources associated with the first CORESET group over the first component carrier in accordance with a first mapping pair of the value of the carrier indicator field in the single DCI message, where the first mapping pair includes the first component carrier and the first CORESET group. In some examples, the downlink transmitting manager 1320 may transmit the one or more second downlink data transmissions on the second set of downlink resources associated with the second CORESET group over a second component carrier different from the first component carrier in accordance with a second mapping pair of the value of the carrier indicator field in the single DCI message, where the second mapping pair includes the second component carrier and the second CORESET group.

The communication parameter manager 1325 may communicate, with the UE, using a first set of parameters associated with the first CORESET group and a second set of parameters associated with the second CORESET group. In some cases, the sets of parameters include a HARQ configuration, a PDSCH scrambling sequence, a CRS rate matching configuration, a TCI state, or any combination thereof.

The RRC transmitting manager 1330 may transmit, to the UE, a DCI message indicating a set of carrier indicator field values, with each carrier indicator field value being associated with a mapping pair including a component carrier of the set of component carriers and at least one of the first CORESET group or the second CORESET group, where transmitting the one or more first downlink data transmissions and the one or more second downlink data transmissions is based on a value of a carrier indicator field in the single DCI message and the set of carrier indicator field values in the DCI message.

In some examples, the RRC transmitting manager 1330 may transmit, to the UE, a DCI message indicating a set of carrier indicator field values, with each carrier indicator field value being associated with two mapping pairs of component carrier and CORESET group values, each mapping pair including a different CORESET group from either the first CORESET group or the second CORESET group, and each mapping pair including a different component carrier from the set of component carriers, where transmitting the one or more first downlink data transmissions and the one or more second downlink data transmissions is based on a value of a carrier indicator field in the single DCI message and the set of carrier indicator field values in the DCI message.

The CIF manager 1335 may determine the first set of parameters associated with the first CORESET group and the second set of parameters associated with the second CORESET group.

In some cases, the value of the carrier indicator field in the single DCI message is associated with both the first CORESET group and the second CORESET group.

Figure 14:
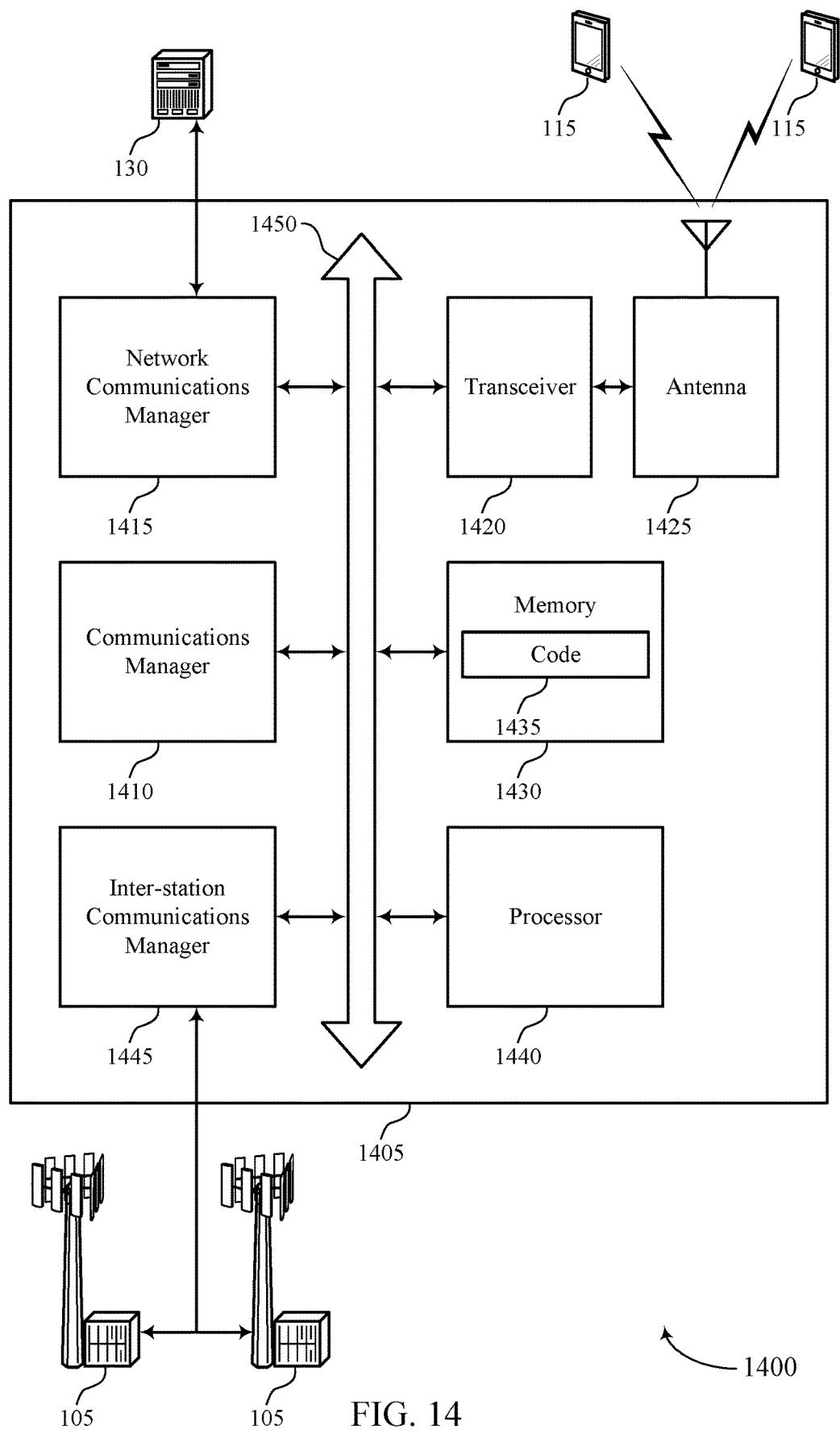
FIG. 14 shows a diagram of a system including a device that supports techniques for multiple component carrier scheduling in accordance with aspects of the present disclosure.

FIG. 14 shows a diagram of a system 1400 including a device 1405 that supports techniques for multiple component carrier scheduling in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE, transmit, to the UE and on a first component carrier of the set of component carriers, one or more DCI messages scheduling downlink data transmissions at the UE, where at least one DCI schedules two or more downlink data transmissions, transmit, to the UE, one or more first downlink data transmissions on the first set of downlink resources and one or more second downlink data transmissions on the second set of downlink resources based on the one or more DCI messages, and communicate, with the UE, using a first set of parameters associated with the first CORESET group and a second set of parameters associated with the second CORESET group.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for multiple component carrier scheduling).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
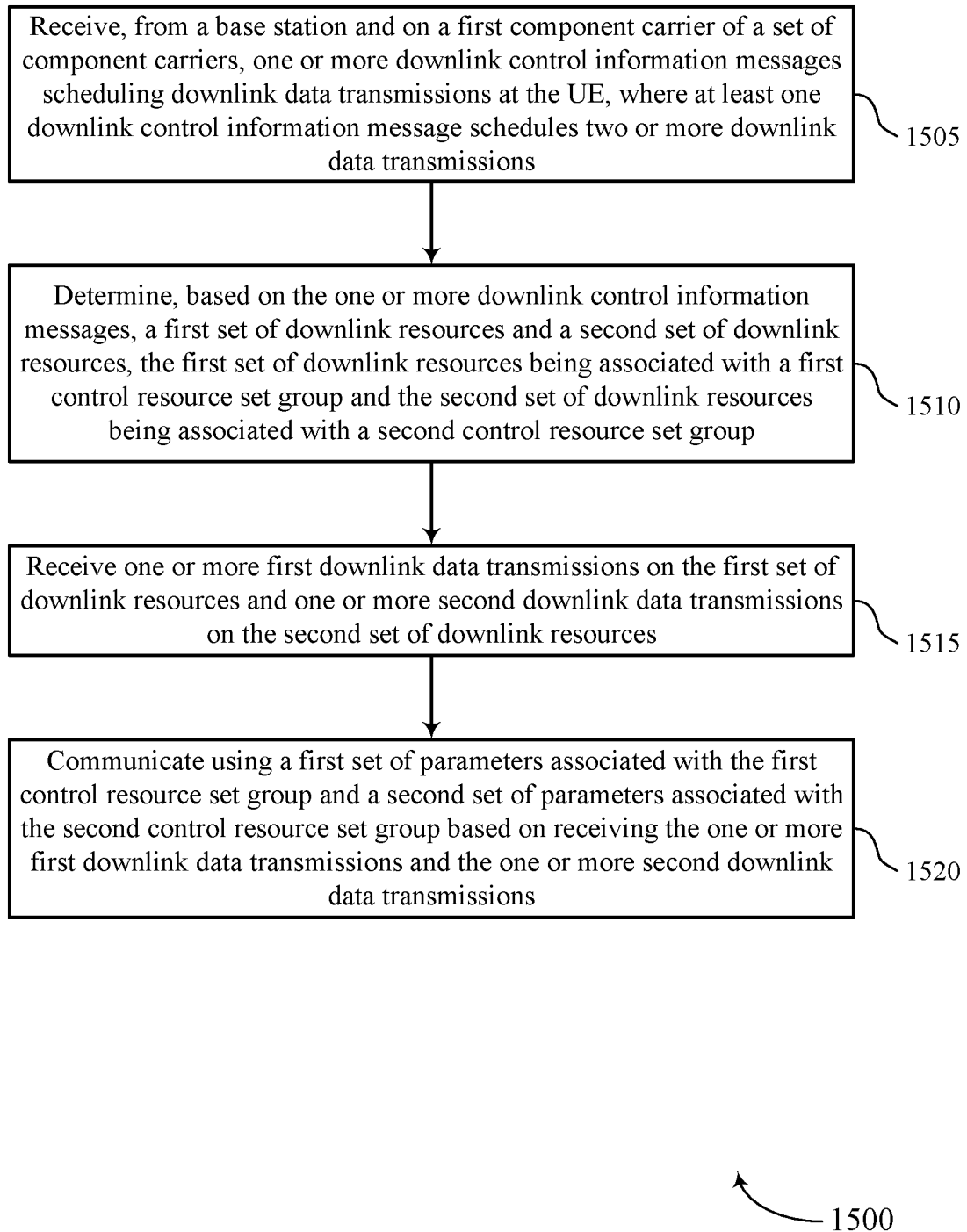
FIGS. 15 through 19 show flowcharts illustrating methods that support techniques for multiple component carrier scheduling in accordance with aspects of the present disclosure.

FIG. 15 shows a flowchart illustrating a method 1500 that supports techniques for multiple component carrier scheduling in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station and on a first component carrier of a set of component carriers, one or more DCI messages scheduling downlink data transmissions at the UE, where at least one DCI message schedules two or more downlink data transmissions. The operations of 1505 may be performed according to the methods described herein. In some examples, aspects of the operations of 1505 may be performed by a DCI receiving manager as described with reference to FIGS. 7 through 10.

At 1510, the UE may determine, based on the one or more DCI messages, a first set of downlink resources and a second set of downlink resources, the first set of downlink resources being associated with a first CORESET group and the second set of downlink resources being associated with a second CORESET group. The operations of 1510 may be performed according to the methods described herein. In some examples, aspects of the operations of 1510 may be performed by a downlink resource manager as described with reference to FIGS. 7 through 10.

At 1515, the UE may receive one or more first downlink data transmissions on the first set of downlink resources and one or more second downlink data transmissions on the second set of downlink resources. The operations of 1515 may be performed according to the methods described herein. In some examples, aspects of the operations of 1515 may be performed by a downlink receiving manager as described with reference to FIGS. 7 through 10.

At 1520, the UE may communicate using a first set of parameters associated with the first CORESET group and a second set of parameters associated with the second CORESET group based on receiving the one or more first downlink data transmissions and the one or more second downlink data transmissions. The operations of 1520 may be performed according to the methods described herein. In some examples, aspects of the operations of 1520 may be performed by a communication parameter manager as described with reference to FIGS. 7 through 10.

Figure 16:
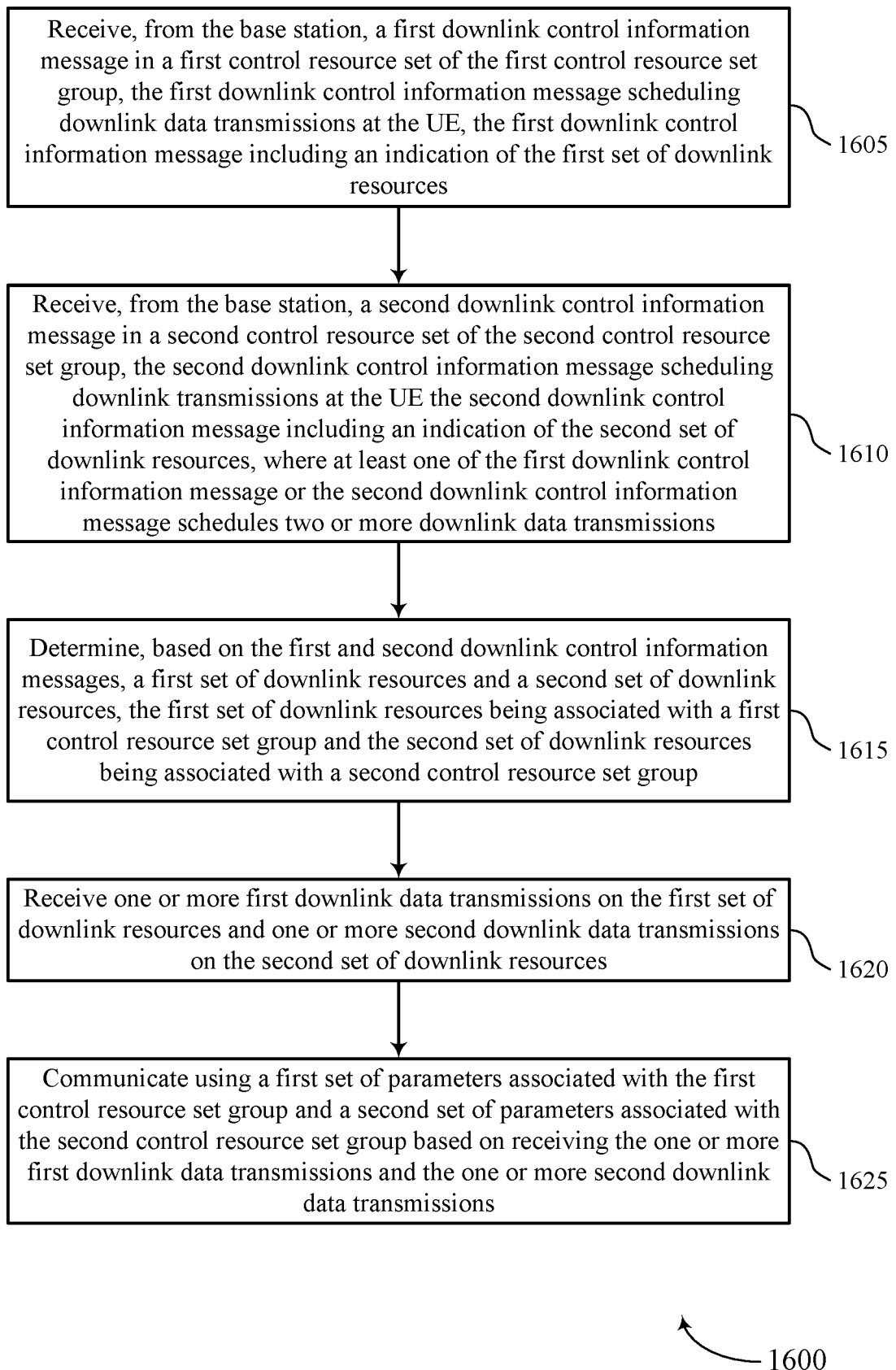

FIG. 16 shows a flowchart illustrating a method 1600 that supports techniques for multiple component carrier scheduling in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from the base station, a first DCI message in a first CORESET of the first CORESET group, the first DCI scheduling downlink data transmissions at the UE, the first DCI message including an indication of the first set of downlink resources. The operations of 1610 may be performed according to the methods described herein. In some examples, aspects of the operations of 1610 may be performed by a DCI receiving manager as described with reference to FIGS. 7 through 10.

At 1610, the UE may receive, from the base station, a second DCI message in a second CORESET of the second CORESET group, the second DCI message scheduling downlink data transmissions at the UE, the second DCI message including an indication of the second set of downlink resources, where at least one of the first DCI or the second DCI scheduled two or more downlink data transmissions. The operations of 1615 may be performed according to the methods described herein. In some examples, aspects of the operations of 1615 may be performed by a DCI receiving manager as described with reference to FIGS. 7 through 10.

At 1615, the UE may determine, based on the first and second DCI messages, a first set of downlink resources and a second set of downlink resources, the first set of downlink resources being associated with a first CORESET group and the second set of downlink resources being associated with a second CORESET group. The operations of 1620 may be performed according to the methods described herein. In some examples, aspects of the operations of 1620 may be performed by a downlink resource manager as described with reference to FIGS. 7 through 10.

At 1620, the UE may receive one or more first downlink data transmissions on the first set of downlink resources and one or more second downlink data transmissions on the second set of downlink resources. The operations of 1625 may be performed according to the methods described herein. In some examples, aspects of the operations of 1625 may be performed by a downlink receiving manager as described with reference to FIGS. 7 through 10.

At 1625, the UE may communicate using a first set of parameters associated with the first CORESET group and a second set of parameters associated with the second CORESET group based on receiving the one or more first downlink data transmissions and the one or more second downlink data transmissions. The operations of 1630 may be performed according to the methods described herein. In some examples, aspects of the operations of 1630 may be performed by a communication parameter manager as described with reference to FIGS. 7 through 10.

Figure 17:
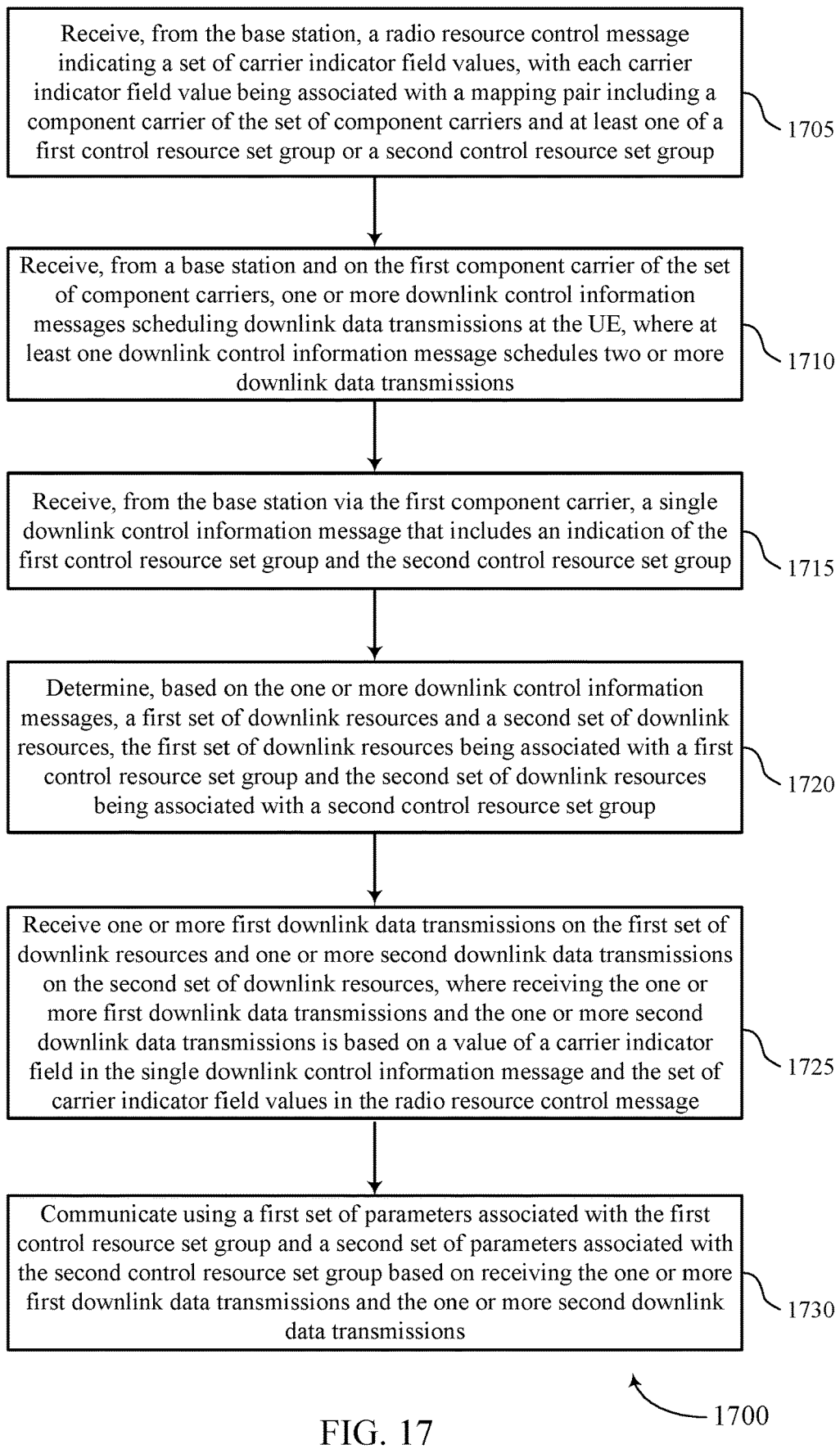

FIG. 17 shows a flowchart illustrating a method 1700 that supports techniques for multiple component carrier scheduling in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from the base station, an RRC message indicating a set of carrier indicator field values, with each carrier indicator field value being associated with a mapping pair including a component carrier of a set of component carriers and at least one of a first CORESET group or a second CORESET group. The operations of 1705 may be performed according to the methods described herein. In some examples, aspects of the operations of 1705 may be performed by a RRC receiving manager as described with reference to FIGS. 7 through 10.

At 1710, the UE may receive, from a base station and on a first component carrier of a set of component carriers, one or more DCI messages scheduling downlink data transmissions at the UE, where at least one DCI message schedules two or more downlink data transmissions. The operations of 1710 may be performed according to the methods described herein. In some examples, aspects of the operations of 1710 may be performed by a DCI receiving manager as described with reference to FIGS. 7 through 10.

At 1715, the UE may receive, from the base station via the first component carrier, a single DCI message that includes an indication of the first CORESET group and the second CORESET group. The operations of 1715 may be performed according to the methods described herein. In some examples, aspects of the operations of 1715 may be performed by a DCI receiving manager as described with reference to FIGS. 7 through 10.

At 1720, the UE may determine, based on the one or more DCI messages, a first set of downlink resources and a second set of downlink resources, the first set of downlink resources being associated with a first CORESET group and the second set of downlink resources being associated with a second CORESET group. The operations of 1720 may be performed according to the methods described herein. In some examples, aspects of the operations of 1720 may be performed by a downlink resource manager as described with reference to FIGS. 7 through 10.

At 1725, the UE may receive one or more first downlink data transmissions on the first set of downlink resources and one or more second downlink data transmissions on the second set of downlink resources, where receiving the one or more first downlink data transmissions and the one or more second downlink data transmissions is based on a value of a carrier indicator field in the single DCI message and the set of carrier indicator field values in the DCI message. The operations of 1725 may be performed according to the methods described herein. In some examples, aspects of the operations of 1725 may be performed by a downlink receiving manager as described with reference to FIGS. 7 through 10.

At 1730, the UE may communicate using a first set of parameters associated with the first CORESET group and a second set of parameters associated with the second CORESET group based on receiving the one or more first downlink data transmissions and the one or more second downlink data transmissions. The operations of 1730 may be performed according to the methods described herein. In some examples, aspects of the operations of 1730 may be performed by a communication parameter manager as described with reference to FIGS. 7 through 10.

Figure 18:
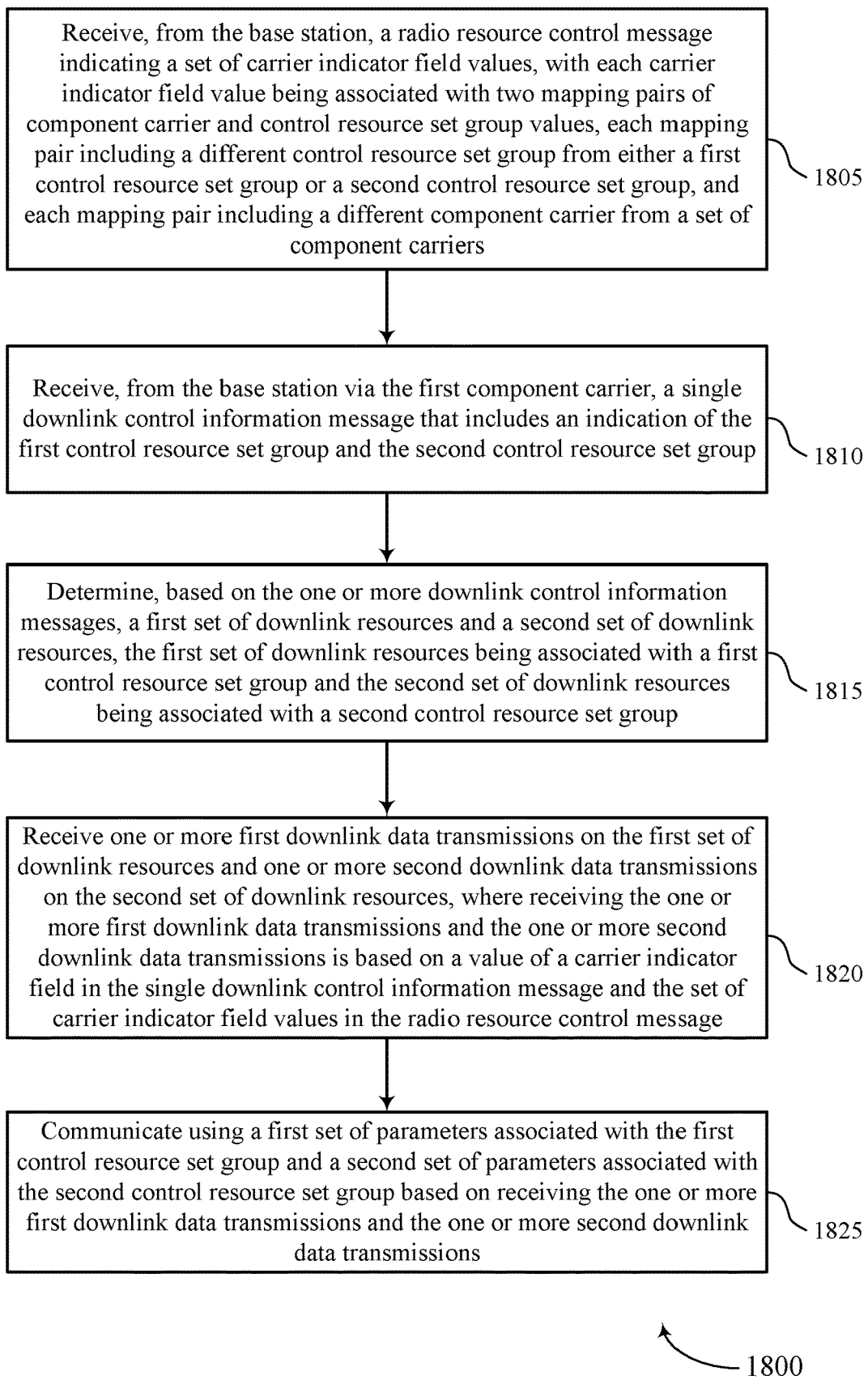

FIG. 18 shows a flowchart illustrating a method 1800 that supports techniques for multiple component carrier scheduling in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from the base station, a DCI message indicating a set of carrier indicator field values, with each carrier indicator field value being associated with two mapping pairs of component carrier and CORESET group values, each mapping pair including a different CORESET group from either a first CORESET group or a second CORESET group, and each mapping pair including a different component carrier from a set of component carriers. The operations of 1805 may be performed according to the methods described herein. In some examples, aspects of the operations of 1805 may be performed by a RRC receiving manager as described with reference to FIGS. 7 through 10.

At 1810, the UE may receive, from the base station via the first component carrier, a single DCI message that includes an indication of the first CORESET group and the second CORESET group. The operations of 1810 may be performed according to the methods described herein. In some examples, aspects of the operations of 1810 may be performed by a DCI receiving manager as described with reference to FIGS. 7 through 10.

At 1815, the UE may determine, based on the one or more DCI messages, a first set of downlink resources and a second set of downlink resources, the first set of downlink resources being associated with a first CORESET group and the second set of downlink resources being associated with a second CORESET group. The operations of 1815 may be performed according to the methods described herein. In some examples, aspects of the operations of 1815 may be performed by a downlink resource manager as described with reference to FIGS. 7 through 10.

At 1820, the UE may receive one or more first downlink data transmissions on the first set of downlink resources and one or more second downlink data transmissions on the second set of downlink resources, where receiving the one or more first downlink data transmissions and the one or more second downlink data transmissions is based on a value of a carrier indicator field in the single DCI message and the set of carrier indicator field values in the DCI message. The operations of 1820 may be performed according to the methods described herein. In some examples, aspects of the operations of 1820 may be performed by a downlink receiving manager as described with reference to FIGS. 7 through 10.

At 1825, the UE may communicate using a first set of parameters associated with the first CORESET group and a second set of parameters associated with the second CORESET group based on receiving the one or more first downlink data transmissions and the one or more second downlink data transmissions. The operations of 1825 may be performed according to the methods described herein. In some examples, aspects of the operations of 1825 may be performed by a communication parameter manager as described with reference to FIGS. 7 through 10.

Figure 19:
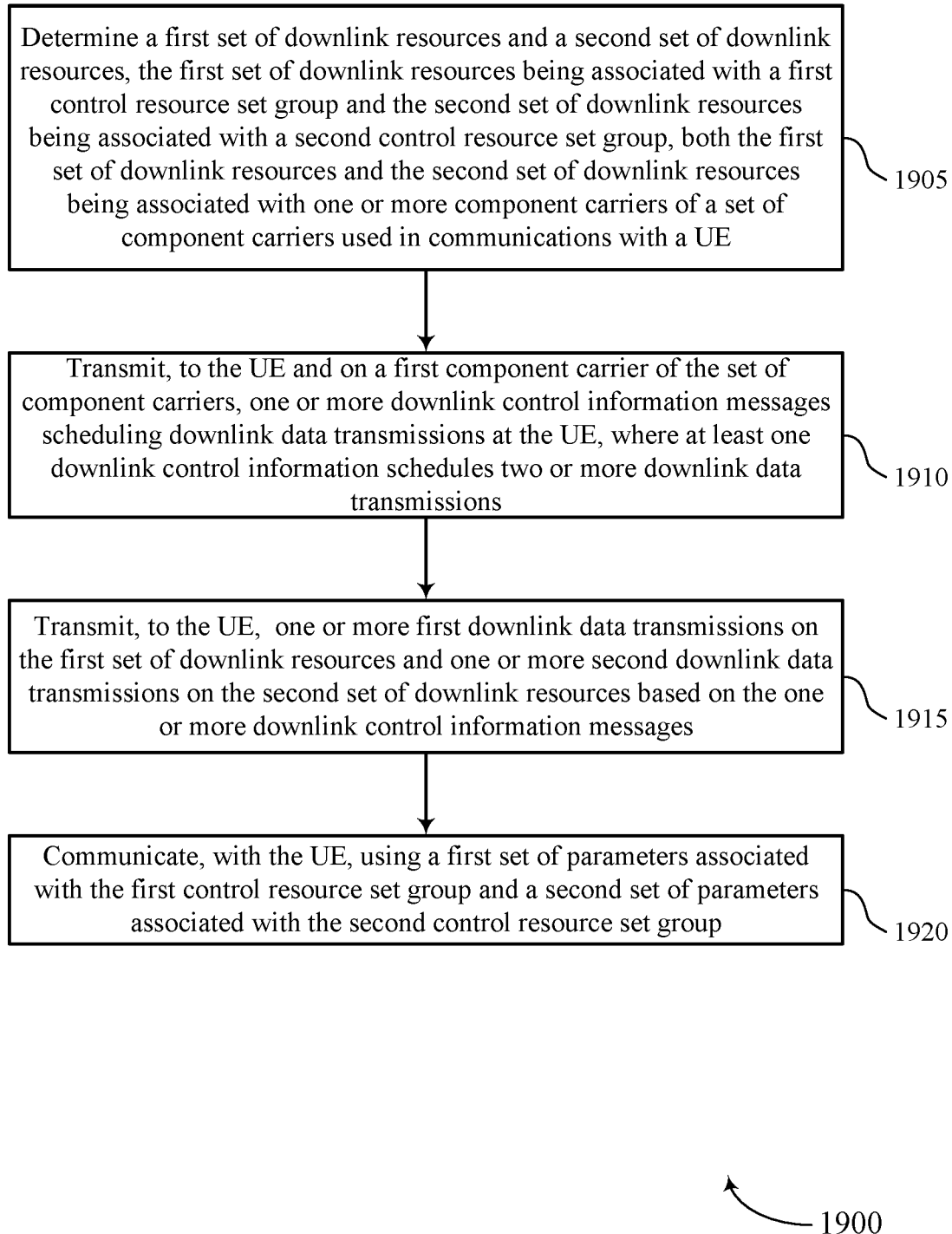

FIG. 19 shows a flowchart illustrating a method 1900 that supports techniques for multiple component carrier scheduling in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a set of component carriers used in communications with a UE. The operations of 1905 may be performed according to the methods described herein. In some examples, aspects of the operations of 1905 may be performed by a downlink resource manager as described with reference to FIGS. 11 through 14.

At 1910, the base station may transmit, to the UE and on a first component carrier of the set of component carriers, one or more DCI messages scheduling downlink data transmissions at the UE, where at least one DCI schedules two or more downlink data transmissions. The operations of 1910 may be performed according to the methods described herein. In some examples, aspects of the operations of 1910 may be performed by a DCI transmitting manager as described with reference to FIGS. 11 through 14.

At 1915, the base station may transmit, to the UE, one or more first downlink data transmissions on the first set of downlink resources and one or more second downlink data transmissions on the second set of downlink resources based on the one or more DCI messages. The operations of 1915 may be performed according to the methods described herein. In some examples, aspects of the operations of 1915 may be performed by a downlink transmitting manager as described with reference to FIGS. 11 through 14.

At 1920, the base station may communicate, with the UE, using a first set of parameters associated with the first CORESET group and a second set of parameters associated with the second CORESET group. The operations of 1920 may be performed according to the methods described herein. In some examples, aspects of the operations of 1920 may be performed by a communication parameter manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure.

Aspect 1: A method for wireless communication at a UE, including: receiving, from a base station and on a first component carrier of a plurality of component carriers, one or more DCI messages scheduling downlink data transmissions at the UE, wherein at least one DCI message schedules two or more downlink data transmissions; determining, based on the one or more DCI messages, a first set of downlink resources and a second set of downlink resources, the first set of downlink resources being associated with a first CORESET group and the second set of downlink resources being associated with a second CORESET group; receiving one or more first downlink data transmissions on the first set of downlink resources and one or more second downlink data transmissions on the second set of downlink resources; and communicating using a first set of parameters associated with the first CORESET group and a second set of parameters associated with the second CORESET group based at least in part on receiving the one or more first downlink data transmissions and the one or more second downlink data transmissions.

Aspect 2: The method of Aspect 1, wherein receiving the one or more DCI messages comprises: receiving, from the base station, a first DCI message in a first CORESET of the first CORESET group, the first DCI message including an indication of the first set of downlink resources; and receiving, from the base station, a second DCI message in a second CORESET of the second CORESET group, the second DCI message including an indication of the second set of downlink resources.

Aspect 3: The method of Aspect 2, wherein determining the first set of downlink resources and the second set of downlink resources further comprises: determining that the first set of downlink resources associated with the first CORESET group comprises first and second subsets of the first set of downlink resources within different component carriers; and determining that the second set of downlink resources associated with the second CORESET group comprises first and second subsets of the second set of downlink resources within different component carriers.

Aspect 4: The method of any of Aspects 1 through 3, wherein receiving the one or more DCI messages comprises: receiving, from the base station via the first component carrier, a single DCI message that comprises an indication of the first CORESET group and the second CORESET group.

Aspect 5: The method of Aspect 4, further including: receiving, from the base station, a RRC message indicating a set of carrier indicator field values, with each carrier indicator field value being associated with a mapping pair including a component carrier of the plurality of component carriers and at least one of the first CORESET group or the second CORESET group, wherein receiving the one or more first downlink data transmissions and the one or more second downlink data transmissions is based at least in part on a value of a carrier indicator field in the single DCI message and the set of carrier indicator field values in the RRC message.

Aspect 6: The method of Aspect 5, wherein the value of the carrier indicator field in the single DCI message is associated with both the first CORESET group and the second CORESET group.

Aspect 7: The method of any of Aspects 5 through 6, wherein receiving the one or more first downlink data transmissions and the one or more second downlink data transmissions comprises: receiving the one or more first downlink data transmissions and the one or more second downlink data transmissions over the first component carrier in accordance with the value of the carrier indicator field in the single DCI message.

Aspect 8: The method of any of Aspects 5 through 8, wherein receiving the one or more first downlink data transmissions and the one or more second downlink data transmissions comprises: receiving the one or more first downlink data transmissions on the first set of downlink resources associated with the first CORESET group over a second component carrier different from the first component carrier in accordance with a first mapping pair of the value of the carrier indicator field in the single DCI message, wherein the first mapping pair comprises the second component carrier and the first CORESET group; and receiving the one or more second downlink data transmissions on the second set of downlink resources associated with the second CORESET group over the second component carrier in accordance with a second mapping pair of the value of the carrier indicator field in the single DCI message, wherein the second mapping pair comprises the second component carrier and the second CORESET group.

Aspect 9: The method of any of Aspects 4 through 8, further including: receiving, from the base station, a RRC message indicating a set of carrier indicator field values, with each carrier indicator field value being associated with two mapping pairs of component carrier and CORESET group values, each mapping pair including a different CORESET group from either the first CORESET group or the second CORESET group, and each mapping pair including a different component carrier from the plurality of component carriers, wherein receiving the one or more first downlink data transmissions and the one or more second downlink data transmissions is based at least in part on a value of a carrier indicator field in the single DCI message and the set of carrier indicator field values in the RRC message.

Aspect 10: The method of Aspect 10, wherein receiving the one or more first downlink data transmissions and the one or more second downlink data transmissions comprises: receiving the one or more first downlink data transmissions on the first set of downlink resources associated with the first CORESET group over the first component carrier in accordance with a first mapping pair of the value of the carrier indicator field in the single DCI message; wherein the first mapping pair comprises the first component carrier and the first CORESET group; and receiving the one or more second downlink data transmissions on the second set of downlink resources associated with the second CORESET group over a second component carrier different from the first component carrier in accordance with a second mapping pair of the value of the carrier indicator field in the single DCI message, wherein the second mapping pair comprises the second component carrier and the second CORESET group.

Aspect 11: The method of any of Aspects 1 through 10, wherein the first set of parameters, the second set of parameters, or both, comprise: a HARQ configuration, a PDSCH scrambling sequence, a CRS rate matching configuration, a TCI state, or any combination thereof.

Aspect 12: A method for wireless communication at a base station, including: determining a first set of downlink resources and a second set of downlink resources, the first set of downlink resources being associated with a first CORESET group and the second set of downlink resources being associated with a second CORESET group, both the first set of downlink resources and the second set of downlink resources being associated with one or more component carriers of a plurality of component carriers used in communications with a UE; transmitting, to the UE and on a first component carrier of the plurality of component carriers, one or more DCI messages scheduling downlink data transmissions at the UE, wherein at least one DCI schedules two or more downlink data transmissions; transmitting, to the UE, one or more first downlink data transmissions on the first set of downlink resources and one or more second downlink data transmissions on the second set of downlink resources based at least in part on the one or more DCI messages; and communicating, with the UE, using a first set of parameters associated with the first CORESET group and a second set of parameters associated with the second CORESET group.

Aspect 13: The method of Aspect 12, wherein transmitting the one or more DCI messages comprises: transmitting, to the UE, a first DCI message in a first CORESET of the first CORESET group, the first DCI message including an indication of the first set of downlink resources; and transmitting, to the UE, a second DCI message in a second CORESET of the second CORESET group, the second DCI message including an indication of the second set of downlink resources.

Aspect 14: The method of Aspect 13, wherein determining the first set of downlink resources and the second set of downlink resources further comprises: determining that the first set of downlink resources associated with the first CORESET group comprises first and second subsets of the first set of downlink resources within different component carriers; and determining that the second set of downlink resources associated with the second CORESET group comprises first and second subsets of the second set of downlink resources within different component carriers.

Aspect 15: The method of any of Aspects 12 through 14, wherein transmitting the one or more DCI messages comprises: transmitting, to the UE via the first component carrier, a single DCI message that comprises an indication of the first CORESET group and the second CORESET group.

Aspect 16: The method of Aspect 15, further including: transmitting, to the UE, a RRC message indicating a set of carrier indicator field values, with each carrier indicator field value being associated with a mapping pair including a component carrier of the plurality of component carriers and at least one of the first CORESET group or the second CORESET group, wherein transmitting the one or more first downlink data transmissions and the one or more second downlink data transmissions is based at least in part on a value of a carrier indicator field in the single DCI message and the set of carrier indicator field values in the RRC message.

Aspect 17: The method of Aspect 15, wherein the value of the carrier indicator field in the single DCI message is associated with both the first CORESET group and the second CORESET group.

Aspect 18: The method of any of Aspects 16 through 17, wherein transmitting the one or more first downlink data transmissions and the one or more second downlink data transmissions comprises: transmitting the one or more first downlink data transmissions and the one or more second downlink data transmissions over the first component carrier in accordance with the value of the carrier indicator field in the single DCI message.

Aspect 19: The method of any of Aspects 16 through 18, wherein transmitting the one or more first downlink data transmissions and the one or more second downlink data transmissions comprises: transmitting the one or more first downlink data transmissions on the first set of downlink resources associated with the first CORESET group over a second component carrier different from the first component carrier in accordance with a first mapping pair of the value of the carrier indicator field in the single DCI message, wherein the first mapping pair comprises the second component carrier and the first CORESET group; and transmitting the one or more second downlink data transmissions on the second set of downlink resources associated with the second CORESET group over the second component carrier, in accordance with a second mapping pair of the value of the carrier indicator field in the single DCI message, wherein the second mapping pair comprises the second component carrier and the second CORESET group.

Aspect 20: The method of any of Aspects 15 through 19, further including: transmitting, to the UE, a RRC message indicating a set of carrier indicator field values, with each carrier indicator field value being associated with two mapping pairs of component carrier and CORESET group values, each mapping pair including a different CORESET group from either the first CORESET group or the second CORESET group, and each mapping pair including a different component carrier from the plurality of component carriers, wherein transmitting the one or more first downlink data transmissions and the one or more second downlink data transmissions is based at least in part on a value of a carrier indicator field in the single DCI message and the set of carrier indicator field values in the RRC message.

Aspect 21: The method of Aspect 20, wherein transmitting the one or more first downlink data transmissions and the one or more second downlink data transmissions comprises: transmitting the one or more first downlink data transmissions on the first set of downlink resources associated with the first CORESET group over the first component carrier in accordance with a first mapping pair of the value of the carrier indicator field in the single DCI message, wherein the first mapping pair comprises the first component carrier and the first CORESET group; and transmitting the one or more second downlink data transmissions on the second set of downlink resources associated with the second CORESET group over a second component carrier different from the first component carrier in accordance with a second mapping pair of the value of the carrier indicator field in the single DCI message, wherein the second mapping pair comprises the second component carrier and the second CORESET group.

Aspect 22: The method of any of Aspects 12 through 21, wherein the first set of parameters, the second set of parameters, or both, comprise: a HARQ configuration, a PDSCH scrambling sequence, a CRS rate matching configuration, a TCI state, or any combination thereof.

Aspect 23: An apparatus or non-transitory machine-readable medium configured to carry out any of Aspects 1 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station and on a first component carrier of a plurality of component carriers, one or more messages, wherein each of the one or more messages includes a downlink control information that schedules two or more downlink data transmissions;
   receiving, based on the one or more messages, one or more first downlink data transmissions on a first set of downlink resources and one or more second downlink data transmissions on a second set of downlink resources, wherein the first set of downlink resources is associated with a first control resource set group, and the second set of downlink resources is associated with a second control resource set group; and
   communicating using a first set of parameters associated with the first control resource set group and a second set of parameters associated with the second control resource set group based at least in part on receiving the one or more first downlink data transmissions and the one or more second downlink data transmissions.

2. The method of claim 1, wherein receiving the one or more messages comprises:
   receiving, from the base station, a first message in a first control resource set of the first control resource set group, the first message comprising an indication of the first set of downlink resources; and
   receiving, from the base station, a second message in a second control resource set of the second control resource set group, the second message comprising an indication of the second set of downlink resources.

3. The method of claim 2, wherein
   the first set of downlink resources associated with the first control resource set group includes first and second subsets of the first set of downlink resources within different component carriers, and
   the second set of downlink resources associated with the second control resource set group includes first and second subsets of the second set of downlink resources within different component carriers.

4. The method of claim 1, wherein receiving the one or more messages comprises:
   receiving, from the base station via the first component carrier, a single message that comprises an indication of the first control resource set group and the second control resource set group.

5. The method of claim 4, further comprising:
   receiving, from the base station, a radio resource control message indicating a set of carrier indicator field values, with each carrier indicator field value being associated with a mapping pair including a component carrier of the plurality of component carriers and at least one of the first control resource set group or the second control resource set group, wherein receiving the one or more first downlink data transmissions and the one or more second downlink data transmissions is based at least in part on a value of a carrier indicator field in the single on message and the set of carrier indicator field values in the radio resource control message.

6. The method of claim 5, wherein the value of the carrier indicator field in the single message is associated with both the first control resource set group and the second control resource set group.

7. The method of claim 5, wherein receiving the one or more first downlink data transmissions and the one or more second downlink data transmissions comprises:
   receiving the one or more first downlink data transmissions and the one or more second downlink data transmissions over the first component carrier in accordance with the value of the carrier indicator field in the single message.

8. The method of claim 5, wherein receiving the one or more first downlink data transmissions and the one or more second downlink data transmissions comprises:
   receiving the one or more first downlink data transmissions on the first set of downlink resources associated with the first control resource set group over a second component carrier different from the first component carrier in accordance with a first mapping pair of the value of the carrier indicator field in the single message, wherein the first mapping pair includes the second component carrier and the first control resource set group; and
   receiving the one or more second downlink data transmissions on the second set of downlink resources associated with the second control resource set group over the second component carrier in accordance with a second mapping pair of the value of the carrier indicator field in the single message, wherein the second mapping pair includes the second component carrier and the second control resource set group.

9. The method of claim 4, further comprising:
   receiving, from the base station, a radio resource control message indicating a set of carrier indicator field values, with each carrier indicator field value being associated with two mapping pairs of component carrier and control resource set group values, each mapping pair including a different control resource set group from either the first control resource set group or the second control resource set group, and each mapping pair including a different component carrier from the plurality of component carriers, wherein receiving the one or more first downlink data transmissions and the one or more second downlink data transmissions is based at least in part on a value of a carrier indicator field in the single ion message and the set of carrier indicator field values in the radio resource control message.

10. The method of claim 9, wherein receiving the one or more first downlink data transmissions and the one or more second downlink data transmissions comprises:
receiving the one or more first downlink data transmissions on the first set of downlink resources associated with the first control resource set group over the first component carrier in accordance with a first mapping pair of the value of the carrier indicator field in the single message; wherein the first mapping pair includes the first component carrier and the first control resource set group; and
receiving the one or more second downlink data transmissions on the second set of downlink resources associated with the second control resource set group over a second component carrier different from the first component carrier in accordance with a second mapping pair of the value of the carrier indicator field in the single message, wherein the second mapping pair includes the second component carrier and the second control resource set group.

11. The method of claim 1, wherein the first set of parameters, the second set of parameters, or both, comprise: a hybrid automatic repeat request configuration, a physical downlink shared channel scrambling sequence, a cell-specific reference signal rate matching configuration, a transmission configuration indicator state, or any combination thereof.

12. A method for wireless communication at a base station, comprising:
determining a first set of downlink resources and a second set of downlink resources, the first set of downlink resources being associated with a first control resource set group and the second set of downlink resources being associated with a second control resource set group, both the first set of downlink resources and the second set of downlink resources being associated with one or more component carriers of a plurality of component carriers used in communications with a user equipment (UE);
transmitting, to the UE and on a first component carrier of the plurality of component carriers, one or more messages where each of the one or more messages schedules two or more downlink data transmissions;
transmitting, to the UE based on the one or more messages, one or more first downlink data transmissions on the first set of downlink resources and one or more second downlink data transmissions on the second set of downlink resources; and
communicating, with the UE, using a first set of parameters associated with the first control resource set group and a second set of parameters associated with the second control resource set group.

13. The method of claim 12, wherein transmitting the one or more messages comprises:
transmitting, to the UE, a first message in a first control resource set of the first control resource set group, the first message comprising an indication of the first set of downlink resources; and
transmitting, to the UE, a second message in a second control resource set of the second control resource set group, the second message comprising an indication of the second set of downlink resources.

14. The method of claim 13, wherein determining the first set of downlink resources and the second set of downlink resources further comprises:
determining that the first set of downlink resources associated with the first control resource set group includes first and second subsets of the first set of downlink resources within different component carriers; and
determining that the second set of downlink resources associated with the second control resource set group includes first and second subsets of the second set of downlink resources within different component carriers.

15. The method of claim 12, wherein transmitting the one or more messages comprises:
transmitting, to the UE via the first component carrier, a single message that comprises an indication of the first control resource set group and the second control resource set group.

16. The method of claim 15, further comprising:
transmitting, to the UE, a radio resource control message indicating a set of carrier indicator field values, with each carrier indicator field value being associated with a mapping pair including a component carrier of the plurality of component carriers and at least one of the first control resource set group or the second control resource set group, wherein transmitting the one or more first downlink data transmissions and the one or more second downlink data transmissions is based at least in part on a value of a carrier indicator field in the single message and the set of carrier indicator field values in the radio resource control message.

17. The method of claim 16, wherein the value of the carrier indicator field in the single message is associated with both the first control resource set group and the second control resource set group.

18. The method of claim 16, wherein transmitting the one or more first downlink data transmissions and the one or more second downlink data transmissions comprises:
transmitting the one or more first downlink data transmissions and the one or more second downlink data transmissions over the first component carrier in accordance with the value of the carrier indicator field in the single message.

19. The method of claim 16, wherein transmitting the one or more first downlink data transmissions and the one or more second downlink data transmissions comprises:
transmitting the one or more first downlink data transmissions on the first set of downlink resources associated with the first control resource set group over a second component carrier different from the first component carrier in accordance with a first mapping pair of the value of the carrier indicator field in the single message, wherein the first mapping pair includes the second component carrier and the first control resource set group; and
transmitting the one or more second downlink data transmissions on the second set of downlink resources associated with the second control resource set group over the second component carrier, in accordance with a second mapping pair of the value of the carrier indicator field in the single message, wherein the second mapping pair includes the second component carrier and the second control resource set group.

20. The method of claim 15, further comprising:
transmitting, to the UE, a radio resource control message indicating a set of carrier indicator field values, with each carrier indicator field value being associated with two mapping pairs of component carrier and control resource set group values, each mapping pair including a different control resource set group from either the first control resource set group or the second control resource set group, and each mapping pair including a different component carrier from the plurality of component carriers, wherein transmitting the one or more first downlink data transmissions and the one or more second downlink data transmissions is based at least in part on a value of a carrier indicator field in the single message and the set of carrier indicator field values in the radio resource control message.

21. The method of claim 20, wherein transmitting the one or more first downlink data transmissions and the one or more second downlink data transmissions comprises:
transmitting the one or more first downlink data transmissions on the first set of downlink resources associated with the first control resource set group over the first component carrier in accordance with a first mapping pair of the value of the carrier indicator field in the single message, wherein the first mapping pair includes the first component carrier and the first control resource set group; and
transmitting the one or more second downlink data transmissions on the second set of downlink resources associated with the second control resource set group over a second component carrier different from the first component carrier in accordance with a second mapping pair of the value of the carrier indicator field in the single message, wherein the second mapping pair includes the second component carrier and the second control resource set group.

22. The method of claim 12, wherein the first set of parameters, the second set of parameters, or both, comprise: a hybrid automatic repeat request configuration, a physical downlink shared channel scrambling sequence, a cell-specific reference signal rate matching configuration, a transmission configuration indicator state, or any combination thereof.

23. An apparatus for wireless communication, comprising:
a processor,
memory coupled with the processor; and
instructions stored in the memory and executable by the processor to cause the apparatus to:
receive, from a base station and on a first component carrier of a plurality of component carriers, one or more messages, wherein each of the one or more messages includes a downlink control information that schedules two or more downlink data transmissions;
receive, based on the one or more messages, one or more first downlink data transmissions on a first set of downlink resources and one or more second downlink data transmissions on a second set of downlink resources, wherein the first set of downlink resources is associated with a first control resource set group, and the second set of downlink resources is associated with a second control resource set group; and
communicate using a first set of parameters associated with the first control resource set group and a second set of parameters associated with the second control resource set group based at least in part on receiving the one or more first downlink data transmissions and the one or more second downlink data transmissions.

24. The apparatus of claim 23, wherein the instructions to receive the one or more messages are executable by the processor to cause the apparatus to:
receive, from the base station, a first message in a first control resource set of the first control resource set group, the first message comprising an indication of the first set of downlink resources; and
receive, from the base station, a second message in a second control resource set of the second control resource set group, the second downlink message comprising an indication of the second set of downlink resources.

25. The apparatus of claim 24, wherein the instructions to determine the first set of downlink resources and the second set of downlink resources further are executable by the processor to cause the apparatus to:
determine that the first set of downlink resources associated with the first control resource set group includes first and second subsets of the first set of downlink resources within different component carriers; and
determine that the second set of downlink resources associated with the second control resource set group includes first and second subsets of the second set of downlink resources within different component carriers.

26. The apparatus of claim 23, wherein the instructions to receive the one or more messages are executable by the processor to cause the apparatus to:
receive, from the base station via the first component carrier, a single message that comprises an indication of the first control resource set group and the second control resource set group.

27. An apparatus for wireless communication, comprising:
a processor,
memory coupled with the processor; and
instructions stored in the memory and executable by the processor to cause the apparatus to:
determine a first set of downlink resources and a second set of downlink resources, the first set of downlink resources being associated with a first control resource set group and the second set of downlink resources being associated with a second control resource set group, both the first set of downlink resources and the second set of downlink resources being associated with one or more component carriers of a plurality of component carriers used in communications with a user equipment (UE);
transmit, to the UE and on a first component carrier of the plurality of component carriers, one or more messages where each of the one or more messages schedules two or more downlink data transmissions;
transmit, to the UE based on the one or more messages, one or more first downlink data transmissions on the first set of downlink resources and one or more second downlink data transmissions on the second set of downlink resources; and
communicate, with the UE, using a first set of parameters associated with the first control resource set group and a second set of parameters associated with the second control resource set group.

28. The apparatus of claim 27, wherein the instructions to transmit the one or more messages are executable by the processor to cause the apparatus to:
transmit, to the UE, a first message in a first control resource set of the first control resource set group, the first message comprising an indication of the first set of downlink resources; and
transmit, to the UE, a second message in a second control resource set of the second control resource set group, the second message comprising an indication of the second set of downlink resources.

29. The apparatus of claim 28, wherein the instructions to determine the first set of downlink resources and the second set of downlink resources further are executable by the processor to cause the apparatus to:
  determine that the first set of downlink resources associated with the first control resource set group includes first and second subsets of the first set of downlink resources within different component carriers; and
  determine that the second set of downlink resources associated with the second control resource set group includes first and second subsets of the second set of downlink resources within different component carriers.

30. The apparatus of claim 27, wherein the instructions to transmit the one or more messages are executable by the processor to cause the apparatus to:
  transmit, to the UE via the first component carrier, a single message that comprises an indication of the first control resource set group and the second control resource set group.

\* \* \* \* \*